US007805141B1

(12) United States Patent
Chow et al.

(10) Patent No.: US 7,805,141 B1
(45) Date of Patent: Sep. 28, 2010

(54) NEIGHBORHOOD CORDLESS SERVICE CALL HANDOFF

(75) Inventors: Albert Chow, Hillsdale, NJ (US); Jinman Kim, Chatham, NJ (US); Spencer Wang, Parsippany, NJ (US); Wenchu Ying, Cedar Knolls, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 0 days.

(21) Appl. No.: 11/788,151

(22) Filed: Apr. 19, 2007

Related U.S. Application Data

(60) Continuation of application No. 11/405,820, filed on Apr. 18, 2006, which is a continuation of application No. 10/914,110, filed on Aug. 9, 2004, now Pat. No. 7,257,404, which is a continuation of application No. 10/119,153, filed on Apr. 10, 2002, now Pat. No. 6,778,832, which is a division of application No. 09/223,316, filed on Dec. 30, 1998, now Pat. No. 6,546,253.

(51) Int. Cl.
*H04W 36/00* (2009.01)
(52) U.S. Cl. .................. 455/436; 455/442; 455/432.1; 455/405; 455/406; 370/331
(58) Field of Classification Search .............. 455/436, 455/442, 432.1, 405, 406; 370/331
See application file for complete search history.

(56) References Cited

U.S. PATENT DOCUMENTS 4,122,308 A 10/1978 Weinberger et al.

(Continued)

FOREIGN PATENT DOCUMENTS

EP 0 602 779 A2 6/1994

(Continued)

OTHER PUBLICATIONS

"TIA/EIA Interim Standrad" Addendum No. 1 to TIA/EIA/IS-1-A, by Global Engineering Documents with the permission of EIA, pp. 14, 266, 332-332-340.

(Continued)

*Primary Examiner*—Nghi H Ly

(57) ABSTRACT

A method and apparatus for providing telephone call hand offs between a local cordless service and a different wireless cellular service such as a macro-cellular service. The local cordless service may be configured such that a mobile telephone equipped subscriber may place or receive calls for a fixed rate, for example, per month without having to pay radio frequency air time charges any time they are located within their selected subscribed-to zones. If the subscribed-to zones are adjacent to one another and the mobile subscriber roams from one zone to another, the subscriber may continue their free call uninterrupted and without paying air time charges. However, when the subscriber roams outside their subscribed-to zones they may be switched from the present local cordless services to conventional personal communications services and pay air time charges. However for an active call, no air-time charges are incurred as the user transitions between the cellular/DPCS environment and the local cordless service environment. Associated apparatus comprises an IBS for automatically changing radio frequency channels as the subscriber roams within a subscribed-to neighborhood zone, roams to another subscribed-to zone or roams outside a subscribed-to zone. Subscribers may choose to use their mobile identification number, their current directory telephone number for wired public switched telephone service or obtain a new directory number.

7 Claims, 18 Drawing Sheets

U.S. PATENT DOCUMENTS

| | | | |
|---|---|---|---|
| 4,456,793 A | 6/1984 | Baker et al. | |
| 4,585,904 A | 4/1986 | Mincone et al. | |
| 4,726,056 A | 2/1988 | An et al. | |
| 5,127,042 A | 6/1992 | Gillig et al. | |
| 5,159,625 A | 10/1992 | Zicker | |
| 5,189,734 A | 2/1993 | Bailey et al. | |
| 5,260,987 A | 11/1993 | Manger | |
| 5,295,180 A | 3/1994 | Vendetti et al. | |
| 5,303,287 A | 4/1994 | Laborde | |
| 5,325,419 A | 6/1994 | Connolly et al. | |
| 5,345,499 A | 9/1994 | Benveniste | |
| 5,404,574 A | 4/1995 | Benveniste | |
| 5,406,615 A | 4/1995 | Miller, II et al. | |
| 5,457,739 A | 10/1995 | Le Cheviller | |
| 5,471,650 A | 11/1995 | Vexler et al. | |
| 5,475,735 A | 12/1995 | Williams et al. | |
| 5,513,379 A | 4/1996 | Benveniste et al. | |
| 5,535,260 A | 7/1996 | Zicker et al. | |
| 5,574,775 A | 11/1996 | Miller, II et al. | |
| 5,590,172 A | 12/1996 | Lodwig et al. | |
| 5,592,470 A | 1/1997 | Rudrapatna et al. | |
| 5,594,782 A | 1/1997 | Zicker et al. | |
| 5,600,706 A | 2/1997 | Dunn et al. | |
| 5,608,708 A | 3/1997 | Ophey | |
| 5,627,831 A | 5/1997 | Azmak | |
| 5,629,974 A | 5/1997 | Rajala et al. | |
| 5,633,910 A | 5/1997 | Cohen | |
| 5,673,306 A | 9/1997 | Amadon et al. | |
| 5,675,628 A | 10/1997 | Hokkanen | |
| 5,675,629 A | 10/1997 | Raffel et al. | |
| 5,687,218 A | 11/1997 | Nakayama | |
| 5,703,934 A | 12/1997 | Zicker et al. | |
| 5,724,665 A | 3/1998 | Abbasi et al. | |
| 5,740,536 A | 4/1998 | Benveniste | |
| 5,752,186 A * | 5/1998 | Malackowski et al. | ... 455/414.1 |
| 5,758,288 A | 5/1998 | Dunn et al. | |
| 5,774,802 A | 6/1998 | Tell et al. | |
| 5,774,805 A | 6/1998 | Zicker | |
| 5,787,352 A | 7/1998 | Benveniste | |
| 5,787,354 A | 7/1998 | Gray et al. | |
| 5,809,423 A | 9/1998 | Benveniste | |
| 5,812,950 A | 9/1998 | Tom | |
| 5,819,180 A | 10/1998 | Alperovich et al. | |
| 5,832,378 A | 11/1998 | Zicker et al. | |
| 5,842,122 A | 11/1998 | Schellinger et al. | |
| 5,857,153 A | 1/1999 | Lupien | |
| 5,862,475 A | 1/1999 | Zicker et al. | |
| 5,873,033 A | 2/1999 | Hjern et al. | |
| 5,873,037 A | 2/1999 | Zicker et al. | |
| 5,878,339 A | 3/1999 | Zicker et al. | |
| 5,878,344 A | 3/1999 | Zicker | |
| 5,903,548 A | 5/1999 | Delamater | |
| 5,918,172 A | 6/1999 | Saunders et al. | |
| 5,940,743 A | 8/1999 | Sunay et al. | |
| 5,960,356 A | 9/1999 | Alperovich et al. | |
| 5,970,415 A | 10/1999 | Sarpola et al. | |
| 5,974,331 A | 10/1999 | Cook et al. | |
| 5,978,672 A | 11/1999 | Hartmaier et al. | |
| 5,987,318 A | 11/1999 | Alperovich et al. | |
| 6,018,652 A | 1/2000 | Frager et al. | |
| 6,044,261 A | 3/2000 | Kazmi | |
| 6,073,015 A | 6/2000 | Berggren et al. | |
| 6,094,582 A | 7/2000 | Zimmermann | |
| 6,097,966 A | 8/2000 | Hanley | |
| 6,137,806 A | 10/2000 | Martinez | |
| 6,148,197 A | 11/2000 | Bridges | |
| 6,167,260 A | 12/2000 | Azam et al. | |
| 6,167,261 A | 12/2000 | Amin | |
| 6,167,279 A | 12/2000 | Chang et al. | |
| 6,181,935 B1 | 1/2001 | Gossman et al. | |
| 6,201,957 B1 | 3/2001 | Son et al. | |
| 6,205,335 B1 | 3/2001 | Furusawa et al. | |
| 6,236,860 B1 | 5/2001 | Hagting et al. | |
| 6,243,572 B1 | 6/2001 | Chow et al. | |
| 6,256,501 B1 | 7/2001 | Tokuyama et al. | |
| 6,308,070 B1 | 10/2001 | Laster | |
| 6,445,911 B1 | 9/2002 | Chow et al. | |
| 6,463,285 B1 | 10/2002 | Davies et al. | |
| 6,470,179 B1 | 10/2002 | Chow et al. | |
| 6,546,253 B1 | 4/2003 | Chow et al. | |
| 6,574,473 B2 | 6/2003 | Rinne et al. | |
| 6,577,866 B1 | 6/2003 | Roberts | |
| 6,594,488 B1 | 7/2003 | Chow et al. | |
| 6,633,554 B1 | 10/2003 | Dalal | |
| 6,708,028 B1 * | 3/2004 | Byrne | ... 455/426.1 |
| 6,778,832 B1 | 8/2004 | Chow et al. | |

FOREIGN PATENT DOCUMENTS

WO     WO 97/13387     4/1997

OTHER PUBLICATIONS

"DIVA-2000 Wireless Local Loop", Diva Communications taken from www.diva.com/product.htm, pp. 1-5, printed Sep. 28, 1998.

"The OptaPhone 2000 Plus-2", OptaPhone 2000 Wireless Point-to-Point Telephone Systems, taken from www.asis.com/optaphone/plusss.html, pp. 1-6, printed Sep. 25, 1998.

"Wireless Communications Industry Survey", Wireless Local Loop World taken from www.telecomresearch.com, pp. 1-2, printed on Sep. 25, 1998.

"OptaPhone Systems Overview", OptaPhone Systems Overview: Products, Markets and Customners taken from www.asis.com/optaphone/osoview.html, pp. 1-6, pp. 1-7, printed Sep. 25, 1998.

* cited by examiner

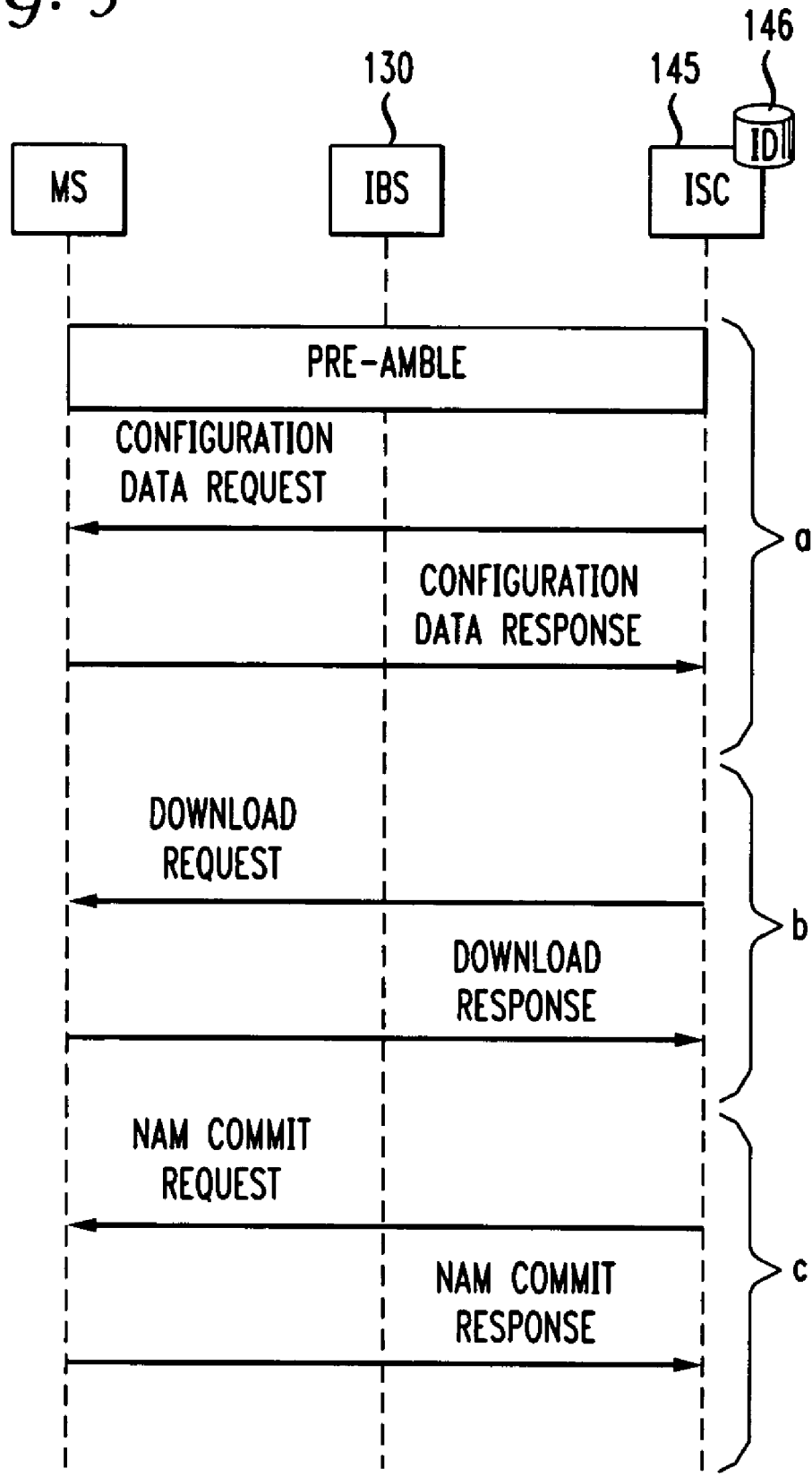

NEIGHBORHOOD CORDLESS SERVICE CALL HANDOFF

This application is a continuation of prior application Ser. No. 11/405,820 filed Apr. 18, 2006, which is a continuation of prior application Ser. No. 10/914,110 filed Aug. 9, 2004 now U.S. Pat. No. 7,257,404, which is a continuation of prior application Ser. No. 10/119,153 filed Apr. 10, 2002 which issued on Aug. 17, 2004 as U.S. Pat. No. 6,778,832, which is a divisional of prior application Ser. No. 09/223,316 filed Dec. 30, 1998 which issued on Apr. 8, 2003 as U.S. Pat. No. 6,546,253.

BACKGROUND OF THE INVENTION

1. Technical Field

This invention relates to the field of providing call handoff in a wireless environment such as a neighborhood cordless service that provides service at a flat rate wherein there is no air time charge for calls made within a home neighborhood zone or subscribed-to visiting neighborhood zone(s).

2. Description of the Related Arts

It is known to provide wireless services for a fixed fee and to charge additional air time fees for each period of time that a subscriber to the wireless services is using the radio frequency spectrum. Such services were initiated in the 1970's as analog wireless services and have become digital over time, for example, the relatively new digital personal communications services (DPCS).

It has been known up until recently to permit users to have cordless telephone apparatus comprising a base station and a mobile unit such that the mobile unit may communicate with the base station over limited distances of several hundred feet. Recently, in the United States, however, a band of frequencies has been made available in the 900 MHZ range for providing cordless telephone service where the mobile station can be as far removed from the base station portion of the station apparatus by as much as one mile under optimal conditions. Consequently, a user would not have to pay for air time charges as in wireless services such as personal communications services if a mobile station is confined within one mile radius of the typically home-located base station.

Fixed wireless subscriber loop services are also known. Equipment for providing such services is available from suppliers such as Diva Communications and OptoPhone Systems. The fixed wireless subscriber loop concept has been used successfully to provide telephone services to remote, for example, mountainous regions. To provide a copper wire subscriber loop to such customers can cost hundreds of thousands of dollars per subscriber. Subscribers to a fixed wireless subscriber loop system have an antenna mounted to their home or business and receive an equivalent of wired services over a wireless link to an antenna site, for example, on the top of the mountain. Service can be provided for a fixed rate, the copper subscriber wired loop eliminated and no air time charges are charged.

There is still a need in the art for a wireless service that would permit a mobile subscriber to roam within a zone close to their home in the same way as a 900 MHZ cordless customer is free to carry their cordless phone from room to room. A mobile subscriber should be able to roam and also move from one zone to another or make calls from non-contiguous zones without having to pay for air time charges. In today's cellular environment, airtime is charged. The current fee structure thus has very little incentive for customers to continue use their cellular phones when they have access to a home-based landline phone. In order to achieve the objectives of one phone, one number anytime and anywhere communications, it is imperative that a neighborhood or local 'cordless type' of services be provided to all the public cellular/PCS subscribers and with incentive to use the same PCS phone in the home/office and around the neighborhood area without air time charges. A subscriber should not lose a call in progress as they move from one subscribed-to zone to another adjacent subscribed zone, and should have the opportunity to switch automatically to known DPCS services and pay air time charges should they so choose.

There is further a need for providing call hand-off in such a proposed wireless service. For example, there is a need to provide call hand-off between cells in such a proposed network and between such a proposed network and an existing conventional network such as a conventional macro-cellular wireless network.

SUMMARY OF THE PRESENT INVENTION

Subscribers to a local cordless service according to the present invention may subscribe to a home neighborhood zone and optionally one or more visiting neighborhood zones from which the subscribers may place telephone calls without having to pay air time charges. By local cordless service is intended a mobile wireless subscriber loop service wherein stations are mobile and the subscriber loop to the customer's premises may be replaced with a wireless loop. The subscriber need not maintain their wired connection to a local exchange carrier (LEC). If the subscribers are current public digital PCS service users, they may use their existing cellular phone and unique mobile identification number (MIN) for subscription to the service. Subscribers may also have the option of electing new wireline numbers to be assigned to their cellular phone for subscription of the service and the numbers assigned may be the traditional PSTN 100 directory number (DN). Alternatively, the subscribers can elect to port their existing wireline DNs to this service. If the subscriber is not a public cellular user, they will need a cellular phone or other mobile station (MS) assigned with either a new DN or their ported DN from the incumbent local exchange carrier (ILEC).

According to one embodiment of the present invention, a subscriber to such a mobile service pays a flat rate that is competitive with or even less expensive than a subscriber to conventional wired public switched telecommunications services. In their home zone, which may be approximately the same size as, or even slightly larger in size than, the range of a standard 900 MHZ cordless phone, the subscriber may carry or otherwise receive services at one flat rate (regardless of air time used). For additional flat fees, the subscriber may also make calls in one or more visited zones which may be contiguous with or remote from the home zone.

When a subscriber travels between the subscribed home zone and an adjacent visiting zone or between adjacent visiting zones, the call may be handed off to the other zone without interruption to the call in progress. Also, when a subscriber moves from any subscribed zone to a public cellular/PCS environment, the call may be handed off without air time charges for the duration of the same call.

As a subscriber leaves their home zone and roams toward a remote (i.e., non-adjacent) visited zone, there exist at least three alternative ways of billing a call in progress. In one embodiment, the call in progress will be terminated when the boundaries of the subscribed-to zone are reached. In another embodiment, the call will be allowed to continue without air time charges for a predetermined period of time as a public cellular carrier (e.g., a conventional digital personal communications service call). In this invention the preferred method is to allow the call to continue but the subscriber will be switched over to public cellular carrier frequency without air-time charges for the duration of the same call Thus, aspects of the present invention describe a method comprising the step of handing off a telephone call involving a mobile station between a first subscribed zone of a local cordless service to a macro-cellular service different from the local cordless service. More specifically, aspects of the invention involve a method comprising the step of handing off a telephone call involving a mobile station between a first subscribed zone of a mobile wireless subscriber loop service to a different wireless cellular service, the first subscribed zone being associated with a mobile station, wherein an amount that is billed toward use of the mobile station is not affected by an amount of airtime used by the mobile station within the first subscribed zone.

Further aspects of the present invention describe a first wireless network configured to communicate with a mobile station and to communicate with a second wireless cellular network, the first wireless network comprising: a first radio transmitter providing a mobile wireless subscriber loop service having a first subscribed zone, the first radio transmitter serving the first subscribed zone associated with the mobile station, a telephone call being in progress involving the mobile station within the first subscribed zone, wherein an amount that is billed toward use of the mobile station is not affected by an amount of airtime used by the mobile station within the subscribed zone; and a switch connected to both the first wireless network and the second wireless cellular network, the switch being configured to assist in handing off a telephone call involving the mobile station to the second wireless cellular network.

These and other features of the present invention will be understood from studying the drawings and the following detailed description of various embodiments.

BRIEF DESCRIPTION OF THE DRAWINGS

FIG. 3 shows the message flow process between a mobile station (MS) and a network server platform (NSP) and associated database (ID) for downloading a number assignment module (NAM).

DETAILED DESCRIPTION OF PREFERRED EMBODIMENTS

Figure 1:
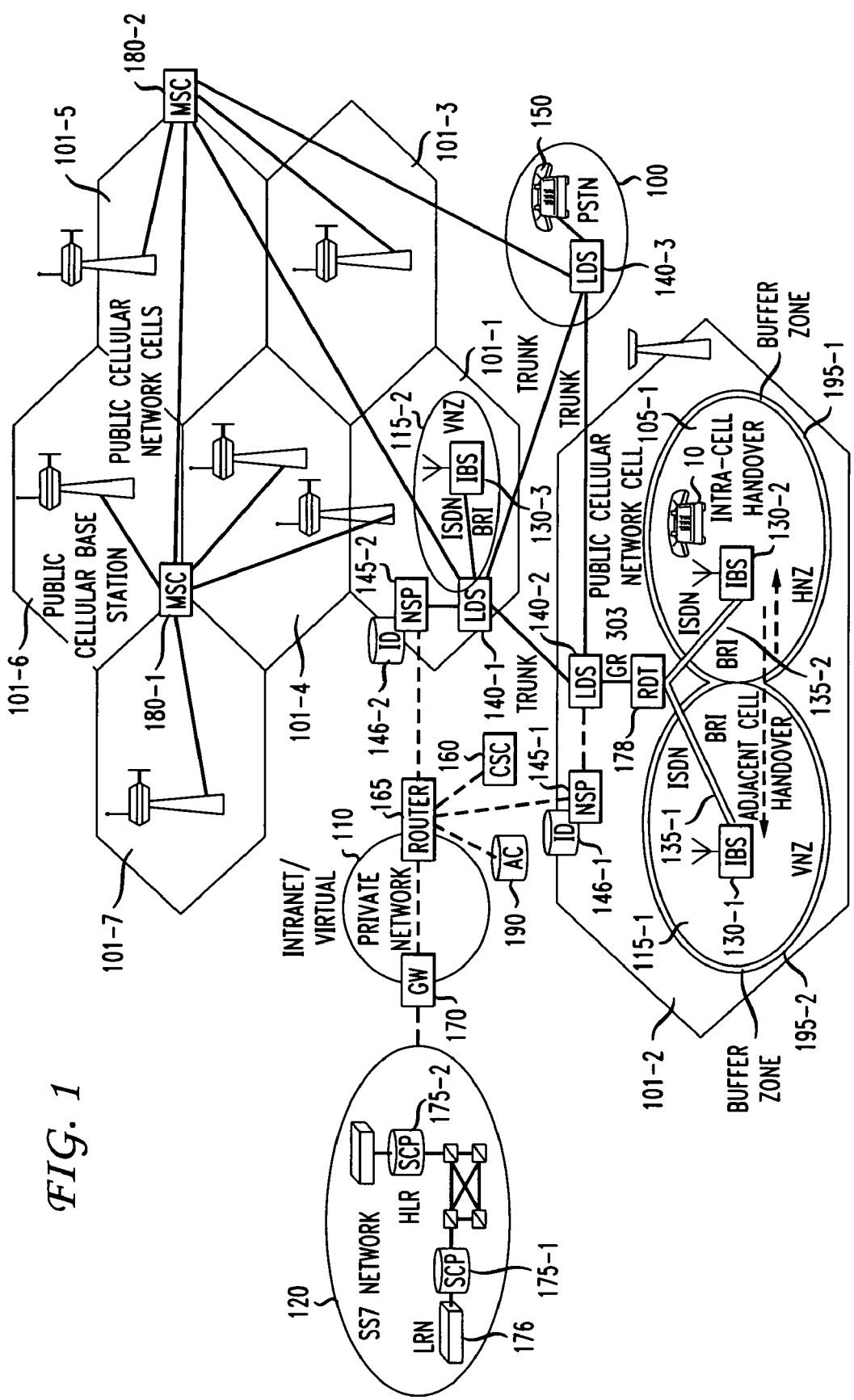
FIG. 1 is a functional block schematic drawing of an exemplary network architecture for providing LCS Local Cordless Services (LCS) and for describing call processing.

Referring to FIG. 1, there is shown an exemplary system architecture for providing local cordless services (LCS) according to the present invention. LCS according to the present invention essentially provides a mobile wireless subscriber loop. If the subscriber chooses, the subscriber may disconnect his preexisting wired service via a local exchange carrier (LEC) and utilize his same directory number for LCS service. The system architecture of FIG. 1 may be overlaid on an existing public switched telephone service network (PSTN) 100 shown above and to the right of a public cellular network cell 101-2 of known cellular wireless service (WS). The LCS service may likewise be overlaid and be provided from the same antenna sites as a conventional cellular wireless service or personal communications service. It is envisioned that the LCS radio equipment 130-1, 130-2, 130-3 can also be attached to telephone poles. For ease of understanding, FIG. 1 presents the PSTN 100 as a separate network entity away from the LCS. Thus, FIG. 1 is simplified to the extent that the conventional wired PSTN 100 may actually surround and include a local cordless services network according to the present invention in much the same way that today a PSTN network 100 surrounds and includes a typical cellular mobile wireless service (WS) network comprising cells 101-1 to 101-7 and/or digital personal communication service (DPCS) network. As will be further described herein, the LCS service network defines a plurality of neighborhood zones, which may comprise home neighborhood zones (HNZs) 105-1 and visiting neighborhood zones (VNZs) 115-1, 115-2 from the point of view of an individual subscriber to the LCS service of the present invention.

In fact, the present LCS service may utilize WS, PCS, and/or DPCS infrastructure such as antenna sites and subscriber apparatus. One advantage of the LCS service is its efficient use of the surrounding network's bandwidth capacity. As will be further described herein, unused channels in the 800 MHZ and 1800 MHZ spectra for WS, PCS, and/or DPCS service may be dynamically allocated to LCS service as taught by U.S. Pat. Nos. 5,809,423 (issued Sep. 15, 1998), 5,787,352 (issued Jul. 28, 1998), 5,740,536 (issued Apr. 14, 1998), 5,513,379 (issued Apr. 30, 1996), 5,404,574 (issued Apr. 4, 1995), and 5,345,499 (issued Sep. 6, 1994), all issued to B. Mathilde et al., which are all incorporated by reference herein in their entireties. Moreover, as taught by these patents, the radio frequency cells may be dynamically configured according to algorithms described therein.

LCS service also differs from current cellular/DPCS service in that the LCS radio equipment interfaces to a local digital line switch and not to a mobile switching center. The local switch provides bearer channels and feature applications as well as the switching fabric for wired lines. The mobile switching center provides comparable capabilities to the cellular/DPCS network. Utilizing a local digital line switch enables LCS to provide feature applications to the LCS subscriber currently available to wired telephony but unavailable via the Mobile Switching Center (MSC) in wireless telephony. Another unique feature of LCS is that the LCS radio equipment, the IBS 130-1, 130-2, 130-3, interfaces to the local switch via ISDN BRI lines and the IBS uses Q.931 signaling for call processing with the LDS 140-1, 140-2. This interface is a widely supported open standard interface and thus the LCS radio equipment (for example, IBS 130-1, 130-2, 130-3) can interwork with any local switch that supports ISDN. Therefore LCS radio equipment appears to the switch as an ISDN terminal station and the radio equipment is responsible for terminating Q.931 protocol and establishing the RF link.

A subscriber 10 in a home neighborhood zone (HNZ) 105-1 of wireless service (WS) cell 101-2 may be a PSTN service subscriber and have a hard-wired telephone (not shown) at their residence within the HNZ 105-1. A local cordless services according to the present invention is not limited by the extensive investment in copper cable distribution facilities which will be referred to herein as a wired subscriber loop. That copper investment (made in a PSTN environment) is avoided with local cordless services according to the present invention. Thus, LCS service is expected to be less expensive to subscribers than conventional wired PSTN service.

Subscriber 10 to a copper-wired PSTN 100 may pay, for example, a fixed rate for telephone service each month and receive unlimited incoming calls within a local calling zone. The typical subscriber 10 may also place free outgoing calls from their residence within the same local calling zone.

According to the present invention of providing local cordless services in the same area, subscriber 10 may not have wired, fixed location apparatus but may be equipped with a mobile cellular telephone or digital personal communications service telephone, for example, a TIA/EIA/Interim Standard-136 compliant DPCS mobile station (MS). For the same monthly rate or a lower monthly rate than the same subscriber may pay for fixed, wired PSTN service, the subscriber carrying mobile station 10 may receive local cordless services. Thus, the LCS subscriber will have equivalent, or in many respects superior, features (such as one number type of mobility service) to a wired PSTN subscriber for the same or lower cost.

Now the present invention of providing a local cordless services also differs from a typical cellular telephone service or personal communications service (PCS), in that both of these conventional services charge air time beyond a flat rate for service. In other words, these conventional services apply an additional per-minute charge for use of the radio frequency spectrum. The present invention of providing a local cordless services permits unlimited air time within the home neighborhood zone 105-1 and any subscribed visiting neighborhood zone(s) 115-1, 115-2, such that the amount billed per service period is fixed, regardless of the amount of airtime used.

Also, the present invention is comparable with the provision of conventional so-called 900 MHZ wireless handsets which communicate with a wired home base station. While it is urged by proponents of such apparatus that such phones are portable and may be used as far away as one mile (or more) from associated home base stations, in practice, many such phones are not capable of operating further than hundreds of feet from their wired base stations, for example, because of unfortunate antenna location, the personal use of the mobile handset portion or the placement of the base station or phone portion within a radio frequency shielded residence or automobile or because of other environmental factors. Another limitation for using a 900 MHz phone is that free airtime can only be achieved when using it around the wired home base station. There is no such concept of visiting zone(s) 115-1, 115-2.

The Home Neighborhood Zone (HNZ)

According to the present invention, each subscriber having an LCS-subscribed mobile station (MS) 10 (this subscriber may or may not have a landline phone but must have a cellular phone or other MS in order to use the invention) will be given the opportunity to make calls free of air time charges anywhere within their home neighborhood zone 105-1. The subscriber's MS 10 may roam throughout the home neighborhood zone and make calls for free within that zone. Another subscriber, for example, a subscriber with MS 150 may have a different home neighborhood zone that is defined by their residence location within that zone. The subscriber may be coincidentally located near the center of their HNZ or toward its perimeter. The HNZ 105-1 thus may be a fixed geographic pattern that may have any desired shape surrounding an intelligent base station (IBS) and antenna site (in this embodiment, IBS 130-2). The HNZ 105-1 may have an elongated shape or other shape to obtain, for example, a large calling and callable population of subscribers. In the drawings, a circular zone is shown but the pattern should not be construed to be so limited. In one embodiment, the pattern may have a radius of between one and one half mile and two miles. In another embodiment, the pattern may have a radius of one half of a mile to one and one half miles, or two to 4 miles. In another embodiment, the HNZ may have a diameter of as much as seven to ten miles. In another embodiment, the shape may be an ellipse or other pattern. The design of HNZ's and visiting neighborhood zones (VNZ's) may be a process involving the calculation of frequent calling patterns and the desirability of inclusion within the zone of frequently called commercial and retail establishments. The design may become an art as well as a science. The concept, however, is clearly to provide at least equivalent service to 900 MHZ cordless telephone service and to provide better than equivalence with respect to the mobility of the phone with wired PSTN 100 service.

The Visiting Neighborhood Zone (VNZ)

The LCS service may comprise a first flat monthly rate for an HNZ 105-1 and may permit additional air time free calling zones named herein as visiting neighborhood zones (VNZ) 115-1, 115-2 for an additional nominal flat rate per each additional visiting neighborhood zone. For subscriber MS 10 whose HNZ is zone 105-1, subscriber MS 10 may have one or more visiting neighborhood zones (VNZ) 115-1, 115-2. The VNZ need not be contiguous with the HNZ, for example, as VNZ 115-1 is contiguous with HNZ 105-1 and VNZ 115-2 is not contiguous with HNZ 105-1. The VNZ's may overlap other VNZ's or HNZ's more than is shown in FIG. 1. When loosely overlapping, for example, the buffer zone 195-1 within the HNZ 105-1 and/or buffer zone 195-2 VNZ 115-1 may provide the subscriber with the ability to travel without loosing a connection between VNZ and VNZ or between HNZ and VNZ. The rate the subscriber must pay may vary with the subscribed-to VNZ or simply be constant for each VNZ added. In another rate plan, the first VNZ may be offered at a given rate and the next VNZ may be added at a lesser additional flat rate. What may be a visiting neighborhood zone 115-1, 115-2 for one subscriber such as subscriber MS 10 will be a home neighborhood zone for another subscriber whose home is located within the zone. Each VNZ is designed in the same way and manner as an HNZ. For example, VNZ 115-1 surrounds IBS and antenna site 130-1 and VNZ 115-2 surrounds IBS and antenna site 130-3 in the same way as HNZ 105-1 surrounds IBS and antenna site 130-2.

The subscriber to LCS service need not select a VNZ for their service that is proximate to or overlaps their HNZ. Subscriber MS 10, for example, may choose VNZ 115-1 or the more remote VNZ 115-2 or both zones in addition to their HNZ 105-1. The subscriber, thus, may choose a VNZ 115-2 that is considerably remote from their HNZ such as a zone surrounding their place of employment, their school or the neighborhood of a family member. The VNZ selected may be a VNZ so remote from their HNZ that a call from their HNZ to the VNZ might be a toll call if it were a wired line PSTN service call.

When subscriber 10 roams from HNZ 105-1 into VNZ 115-1 by way of the labeled buffer zones 195-1, 195-2, there will be no charge for airtime and the call in progress will be maintained. When subscriber 10 roams from HNZ 105-1 into VNZ 115-2, then, there is no overlapping buffer zone, the call in progress may or may not be maintained. If the LCS subscriber happens to be also a public PCS/Cellular service subscriber, the call in progress is handed over to the public PCS/cellular system using public cellular spectrum frequency, there will be no air time charges for the duration of the same call. There exist at least three alternative embodiments for the subscriber 10 that travels outside an HNZ or a VNZ to which they have subscribed. These include 1) allowing the subscriber to continue the call they have initiated or have received without additional charge at least for a predetermined length of time, 2) disconnecting the subscriber from the connection they have for a given call after the subscriber leaves their HNZ or subscribed-to VNZ's or 3) allowing the call to continue outside their HNZ or subscribed-to VNZ's and billing the subscriber for the air time. When the subscriber is within the third alternative, the subscriber may receive a conventional wireless service such as DPCS. As a subscriber reaches a borderline of a subscribed-to zone, the subscriber may see a lit warning lamp, and/or receive an audible or other alert to their status as is further described in copending application, U.S. patent application Ser. No. 09/223,320, entitled, "Automatic Status Indicators for Neighborhood Cordless Services," filed on the same day as the present application and invented by A. Chow, R. Miller II, J. Russell, W. Ying, and S. Wang.

The buffer zone is inherent to each HNZ or VNZ. It is the area that defines the perimeter of the zone where service quality may not be at the optimal level, but service can still be rendered. (NOTE: "buffer zones" also exists in cellular/DPCS, they are just the periphery of a cell, the buffer zone is not unique to LCS.)

Intra-Building Utilization of HNZ and VNZ, for Example, by an Employer

The concept of HNZ and VNZ can be extended to providing an intra-building or intra-office complex LCS. LCS can be used to provide wireless intra-building communications. A home zone may be one location of a company and visiting zones may be frequently visited locations of the same company within the same company premises or another company premises. Service may be provided at one rate for all wireless use of a company owned phone or phone system at a company location. Moreover, in the spirit of U.S. Pat. No. 4,456,793, hereby incorporated by reference in its entirety, the service may be extended to comprising, e.g., an infrared light link between the phones and the IBS and antenna sites. In one embodiment of LCS within a building, different floors of the building, hallways and certain radio frequency shielded or isolated rooms may be equipped with IBS and antenna sites. For example, one sector of one floor may be distinguished from a sector of another floor, if appropriate and depending on the application.

System Architecture

The LCS system architecture will now be described in further detail with reference to FIG. 1. The subscriber's MS 10 may be equipped with a typical DPCS or WS mobile telephone. A DPCS telephone in compliance with IS-136 is preferred in the present invention. Certain enhancements to the basic IS-136 design include audible, light (such as LED), and/or other means of alerting a subscriber of a change in service and/or other status. Without limiting any invention, and by way of example, a set of LEDs may present colored indications of red for no service, a green light for service A, such as conventional cellular or PCS service, a brown light for cellular roaming service and a blue light for service B, the LCS service. By "no service" is intended those times when the mobile telephone is powered and has received a user request, but the mobile station is not able to establish a connection with any service provider. When a subscriber is in their HNZ or VNZ, the station may first try to establish an LCS connection and if not possible, due to low signal strength or because the subscriber is out of a zone, the mobile station will try to establish a conventional WS, PCS or DPCS connection, and also can not establish a connection to these systems.

Another enhancement is the capability for the mobile phone to automatically select the appropriate service provider for the given coverage area. For example, if a customer is a subscriber to both cellular/DPCS and LCS service, it would be cumbersome for the user to remember when to select the correct service profile on their MS (e.g., such as the IS-136 Number Assignment Module (NAM) A for cellular/DPCS service, and NAM B for LCS service.) The mobile phone working in conjunction with the cellular/DPCS or LCS network intelligence will determine the correct service profile (e.g., IS-136 NAM that should be active thus permitting the user to transition between services seamlessly and accurately.

A user subscribes to multiple wireless services and the MS stores the service specific information (e.g., IS-136 NAM) to access the appropriate network. The network(s) associated with all the subscribed services also maintains a database including the subscriber's profile, service subscription, service preferences and priorities. When the customer enters a coverage area and turns on their Mobile Station (MS), the MS remembers the last service environment it registered and attempts to use the same profile with the current network. The network recognizes the customer and retrieves the subscriber profile from the database. Based on the user's current location information, the network determines the preferred service profile for the user. If the current coverage area offers the preferred service environment, the network accepts the registration and the MS is ready for service. If the preferred service environment is available in the coverage area but under another MS service profile, the network directs the MS to switch to that service profile. The MS retrieves the correct service profile data and registers for the new services. These services can be offered by the previously attempted network or by a new network. In either case, the (previously attempted or new) network will again determine if the user is in the correct service environment and using the right profile. If so, the network accepts the registration, the MS informs the subscriber of service (audibly and/or visually), and the subscriber begins to use the service.

Referring to subscriber 10 located in HNZ 105-1, there is shown an intelligent base station (IBS) and antenna site 130-2 at the center of the HNZ 105-1 with which subscriber 10 communicates via their DPCS or WS mobile station. The IBSs 130-1, 130-2 and 130-3 each may comprise a digital software radio station that supports an IS-136 based time division multiple access (TDMA) common air interface. For example, each IBS may support three TDMA frames (this comprises of eight IS-136 digital traffic channels, a digital control channel) and four ISDN-BRI (basic rate interface 2B+D) lines for providing up to eight simultaneous telephone calls. Again by way of example, respective links 135-1 and 135-2 may couple IBS and antenna sites 130-1 and 130-2 to remote digital terminals (RDT) (only a single RDT 178 is shown by way of example), for traffic concentration or relay of the calls to a local subscriber switch (LDS) 140-2 via a GR 303 trunk interface 185, as appropriate. GR-303 relates, for example, to a known remote digital terminal (RDT) to local switch interface comprising an integrated digital loop carrier system and associated requirements. In an alternative embodiment, the IBS 130-3 may communicate directly via ISDN BRI link 135-3 to a local subscriber switch 140-1.

LDS 140:1 or 140-2 may preferably comprise any digital local switch known in the art including, but not limited to, a No. 5 ESS switch manufactured by Lucent Technologies, Inc., or a DMS-100 switch manufactured by Northern Telecom. These switches perform the switching function necessary to connect LCS subscribers to PSTN customers, WS customers, PCS or DPCS customers or other LCS subscribers wherever situated. A network server platform (NSP) (e.g., NSP 145-1, 145-2) of an LCS system may be an adjunct to each LDS 140-1 and 140-2. The NSP may preferably comprise a pair of fully redundant (i.e., for hot standby fault tolerance) Sun Sparc work stations available from Sun Microsystems or other comparable processor programmed as will be further described herein for registration, call processing, and/or call hand-off. Each NSP will have an intelligent database (ID) containing subscriber profile information. Each site may be backed-up by an intelligent spare NSP and ID and program memory backed up on disc or other memory backup. In FIG. 1, LCS subscriber switch 140-2 is coupled to NSP 145-1 and LCS subscriber switch 140-1 is coupled to NSP 145-2. Each NSP operates to effectively control all activities associated with subscriber registration, call setup and tear down, radio frequency engineering, handoffs, feature applications, and operation, administration and maintenance (OA&M) functions. Each respective NSP for a LCS subscriber switch manages all its subtending IBS=s and antenna sites. In the depicted example, a single LCS subscriber switch 140-2 and NSP 145-1 may serve multiple neighborhood zones, in this instance, HNZ 105-1 and VNZ 115-1. The number of zones served by a single NSP need not be limited to two but may comprise 3 or more.

Preferably, all NSP's are linked together for communication via, for example, an IP-based LCS intranet or virtual private network (VPN) comprising of a router 165. During operation, the IP-based network is utilized for passing call and subscriber registration, mobility management and LCS Operation Administration & Maintenance (OA&M) related information. Also coupled via the IP-based intranet or VPN are connections to an authentication center (AC) 190, to a LCS Customer Service Center (CSC) 160, a network management and operations center, and a operations support systems center.

Each NSP may have an associated intelligent database (ID). For example, intelligent database 146-1 is associated with NSP 145-1. The ID may store LCS subscriber profiles, which includes information regarding each LCS subscriber within the HNZ, such as subscribed features and/or calling preferences. The ID also uses the information for communication with other ID's in the event the subscriber has roamed to a VNZ not handled by the associated NSP. For example, in ID 146-1, there would exist subscriber profiles for all subscribers in neighborhood zones 115-1 and 105-1.

The LCS Customer Service Center (LCS CSC) 160 may provide a human or automated service representative interface to any potential or existing subscriber. Typically, the LCS CSC may comprise a known service representative position system or voice response system. The LCS CSC supports at least service activation for subscribers to LCS service and administration of service (for example, facility, trouble and billing queries).

The LCS authentication center (AC) 190 may be a shared resource of the LCS network as is the LCS CSC 160. As will be further described herein, a subscriber to LCS may preserve their directory numbers (DN) if they disconnect their wired PSTN number and connect to LCS service. The LCS AC 190 may utilize IS 136 cellular authentication voice encryption (CAVE) to assist in validating and authenticating subscribers and to provide voice privacy and encryption capabilities. ACAC Gateway (GW) 170 sits within the IP-based LCS intranet or VPN 110 and provides a TCP/IP data link to the SS7 network 120. This IP-based network, as explained above, provides access to and interworks with the home location register for registration of MIN-based LCS subscribers for delivery of calls, for example, from subscriber 150 to LCS subscribers within the neighborhood zones 115-1, 115-2 and 105-1. The GW 170 is responsible for the TCP/IP to SS7/ TCAP protocol conversion between the SS7 network and the LCS network. The GW 170 is also responsible for global location management on a per NSP 145 location basis for, for example, MIN-based call delivery.

For this invention, we use the radio frequency self-configuration algorithm known in U.S. Pat. Nos. 5,809,423; 5,787, 352; 5,740,536; 5,5113,379; 5,404,574 and 5,345,499. This algorithm is designed to sniff and designate unused and interference-free traffic and control channels (such as IS-136 Digital Traffic Channels and digital control channels) from the public macrocellular network for use by an underlying/ stacked cell use. The algorithm will also be able to detect when the public macrocellular network begins to use these channels, and will automatically adjust by re-selecting another unused frequency. This algorithm greatly simplifies the radio frequency engineering and deployment processes. Without this algorithm, the LCS service will need to reserve radio frequencies specifically for LCS use.

The Intelligent Base Station (IBS) and Antenna Site

Figure 2:
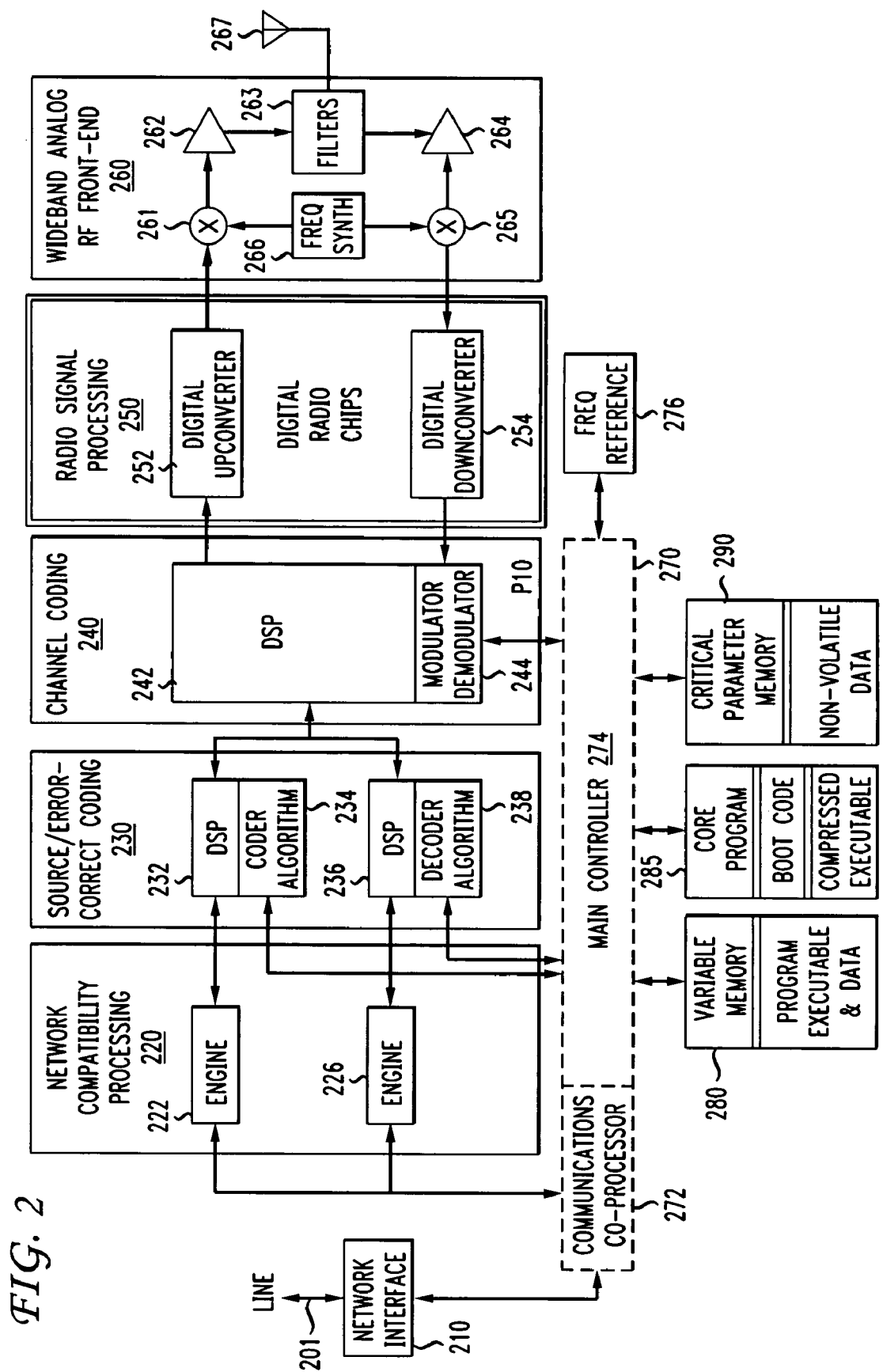
FIG. 2 is a functional block schematic drawing of the intelligent base station (130) shown in FIG. 1.

The intelligent base station (IBS) can be any currently existing radio base station that is known in the art. The IBS should be capable of performing automatic frequency allocation functions, which are known in the art. For this invention, the preferred embodiment is via self-configuration, as described by U.S. Pat. No. 5,724,665. Other U.S. Patents useful in its design include U.S. Pat. Nos. 5,608,708; 5,592, 470; 5,574,775 and 5,406,615. Referring to FIG. 2, there is shown a generalized software radio architecture for an IBS 130 shown in FIG. 1. Line 201 may be an ISDN BRI line as shown or other equivalent data line. Line 201, although not shown, may be coupled via a remote terminal 178 to a switch 140 or directly to the switch per FIG. 1. Line 201 is connected to a communications processor of processing module 270. Communications processor 272 handles all wire line interface control functions. The communications processor is coupled to a network compatibility processing module for handling incoming and outgoing calls requiring either LCS or DPCS or other network compatibility. Main controller 274 is coupled to a source/error correction coding/decoding module 230 and a channel coding module 240. A frequency reference or clock 276 is divided to provide all the reference frequencies needed by any other module including channel coding module 240.

Associated with main controller 274 is variable memory 280, core program memory 285 and critical parameter memory 290. Program executable software and data are stored in variable memory 280. Boot code and compressed executable code are stored in core program memory 285 and non-volatile data are stored in critical parameter memory 290.

Network compatibility processing module 220 comprises a coding engine 222 and a decoding engine 226. Source/error correction coding module 230 comprises a digital signal processor 232 and coder algorithm for encoding and a digital signal processor 236 and decoder algorithm 236 for decoding. The channel coding module 240 contains a digital signal processor 242 for interfacing with the radio frequency processor 250 and includes a modulator/demodulator 244.

Radio signal processing module 250 contains a digital up converter 252 and a digital down converter 254. When up converting, the output is fed via a mixer 261 to an amplifier 262 for outputting via antenna 267 via filter 263. On the antenna receive side, the received signal is fed via filter 263 and amplifier 264 to mixer 265 and the result passed to digital down converter 254. Frequency synthesis circuit 266 provides frequencies at whatever channel frequencies are utilized at a particular point in time.

Antenna 267 may be a sectorized antenna system in one embodiment collecting and radiating energy in 800 MHZ and 1800 MHZ spectra or other suitable spectra. Each zone 105-1 may comprise several such as three sectors or small cells such that an intra-cell hand-off may be required (as will be discussed in connection with FIG. 6a).

Flexibility in Addressing a Subscriber

An LCS subscriber may elect to discontinue their current PSTN directory number (DN) and use that same number as their LCS address (i.e., Local Number Portability—LNP). Alternatively, the LCS subscriber may receive a new LCS directory number. A third option is for the LCS subscriber to use the mobile identification number (MIN) the subscriber may have as a subscriber to wireless cellular services or personal communications services.

On the air interface side, in this embodiment, each IBS has 9 full-rate TDMA channels. Note: Number of full rate channels for the IBS should be made as a variable for this patent, since the number of radio channel per radio port can be designed according to different services applications and coverage density requirements. IBS can provide as many radio channels as long as it meets the design and service deployment financial criteria. Among these channels, one full-rate channel will be designated as the Digital Control Channel (DCCH) and the remaining 8 channels will be used as the Digital Traffic Channel (DTC). In order to support up to 8 simultaneous conversations, for instance, four ISDN-BRI lines may be used to connect the IBS 130 to the LCS local switch 140 (FIG. 1). Therefore, an IBS with 8 DTCs can support up to 8 simultaneous calls. When a user subscribes to the LCS services as a DN-based user, the subscriber will be given a DN during service activation (that is, each DN is assigned with a TEI designated to an IBS) and the MS is in effect assigned to a specific IBS in the subscribed HNZ for call delivery purposes. For example, subscriber 10 will be assigned to IBS 130-2.

Referring again to FIG. 1, since IBS 130 will be connected to an LCS local digital switch such as the No. 5 ESS or DMS-100 digital switch 140, a DN based network switching element, the call routing between the local switch and the IBS must also be DN-based. The LCS service may use Cellular/DPCS RF infrastructure that is a MSC/MIN based switching platform. Therefore, these two different switching algorithms creates alternative call delivery scenarios for LCS calls. Consider the following LCS call delivery scenarios:

When a MIN-based LCS subscriber enters an LCS coverage area and receives an incoming call, the local digital switch 140 will not deliver a MIN based call (that is, only an MSC does it). The local NSP, for example, NSP 145-1 dynamically assigns a DN that belongs to the IBS 130-2 that MS 10 is currently registered to deliver the call.

When the PSTN delivers a call to a DN-based MS, the local digital switch 140 routes the call to the IBS associated with that DN. If the MS is registered with another IBS (which may be referred to as a Target-IBS or T-IBS which could be located in VNZ/HNZ) at that time, the IBS works with the NSP and the local switch to transfer the incoming call to an NSP dynamically assigned DN supported by that T-IBS.

However, if these dynamically assigned DNs as described from the above scenario are assigned previously to a subscriber as a permanent DN, then the LCS system will not immediately be able to deliver the incoming call for lacking of the DN necessary for the local switch to process the incoming call. Two out of the 8 DNs of each IBS's 4 ISDN/BRI lines will be reserved for this purpose and used only for call processing purposes by the local switch. These dynamically assigned DNs should not be assigned to any subscriber. These dynamically assigned DNs from each IBS will be referred to herein as the call Forward DNs (FDNs). The FDNs will be used for MIN-based call delivery and DN-based roaming capabilities. FDNs are transparent to the end-users; they are used internally by the LCS system. When the local switch delivers a call to a MIN-based or visiting DN-based MS, after the NSP locates the MS, the NSP assigns an FDN from the currently registered IBS to the MS in order for the local switch to terminate the call.

PSTN call delivery of DN-based mobiles can also occur using the Advanced Intelligent Network. All DNs associated with DN-based mobiles have triggers set on the digital switch such that when the digital switch 140 receives the call, the switch requests additional routing instructions from the NSP. The NSP pages the MS to determine its current location, T-IBS. If the MS is registered in its home IBS, the NSP directs the switch to complete the call to the DN. If the MS is registered in another IBS, the NSP assigns an available FDN from T-IBS and directs the switch to forward the call to the T-IBS/FDN.

Numbering Schemes

As already introduced above, there exist three numbering options for LCS services: 1) Use an existing cellular/DPCS MIN, 2) Use a new DN or 3) Use a ported ILEC DN (the subscriber's former wired PSTN service telephone number ported from the local exchange carrier).

Call routing differs slightly between a DN-based MS and a MIN-based MS because the MIN-based MS requires interaction with the HLR while the DN-based MS does not.

Numbering Scheme One: Mobile Identification Number

In this addressing scheme option, the new LCS subscriber is an existing wireless service (WS) customer and desires to keep the same MIN for their new LCS services. These subscribers will be identified in this document as MIN-based LCS subscribers.

Numbering Scheme Two: LCS Service Provider Assigns New LCS Phone Directory Number In this addressing scheme option, the new subscribers may or may not have an existing IS-136 phone. However, a DN will be assigned by local service representatives. The DN may be programmed into the IS-136 phone via IS-136 based Over-the-air Activation Teleservice (OATS), described subsequently herein. These subscribers will be identified in this document as DN-based LCS subscribers.

Numbering Scheme Three: Ported Local ILEC DN

LCS subscribers who give up their conventional wired service can port their existing residential landline phone numbers (i.e., from their local exchange carrier, ILEC) to LCS services. The DN can be programmed into the IS-136 phone via IS-136 based OATS. These subscribers will be identified in this document also as DN-based LCS subscribers.

The Process of Actuating an LCS Subscriber

A new LCS subscriber may purchase a MS apparatus at a retail outlet, preferably, an IS 136 compliant mobile station set with a display. The new subscriber then dials a telephone number provided for customer service center (LCS CSC) 160 and is connected to a service representative or a voice interactive response unit known in the art. Either the device or a service representative may welcome the new subscriber's call and thank the new subscriber for subscribing to LCS. Either may then request of the subscriber their personal data which may be verified by known processes. The new subscriber is requested to particularly select an option for addressing: 1) do they wish to disconnect their wired PSTN service and reuse the associated DN, 2) obtain a new LCS number or 3) use their MIN from an existing mobile wireless service. The subscriber is also advised of the rate selection opportunities and boundaries of neighborhood zones they may be interested in.

The LCS CSC 160 then processes and temporarily stores all subscriber information in a subscriber profile including such information as selected home neighborhood zone, visiting neighborhood zone(s) they have subscribed to, calling features, the make and model and electronic serial number of the subscriber's MS, and billing address and payment information. All the related subscriber service profile data will be populated into the LCS CSC database and communicated, for example, by the IP-based intranet or VPN to populate a database at LCS authentication center (AC) 190.

Once the new subscriber is validated and their profile completed, the LCS CSC 160 generates a unique data word that the subscriber will use later to actuate service referred to herein as a feature code. Also, a personal identification number which may be of the new subscriber's choice may be mutually agreed upon and stored. The feature code and/or PIN in combination will be given to the new subscriber so they may actuate their LCS service automatically via a self-activating process to be referred to herein as over-the-air activation teleservice (OATS). The subscriber profile including PIN is further downloaded, in a preferred embodiment, via the IP-based intranet or VPN to intelligent databases 146 for their HNZ and any VNZ to which they have subscribed.

For example, subscriber 10 may be a subscriber to HNZ 105-1, VNZ 115-1 and VNZ 115-2. In such an instance, the subscriber profile will be provided to intelligent databases 146-1 and 146-2.

Henceforth in the detailed description of the invention, call registration, call processing and call hand-off features will be described in FIGS. 3-7 with reference to generic elements, for example, switch 140 or specific elements such as switch 140-1 with not intention to be limited by the use of the specific elements of FIG. 1. The invention is not limited by the specific arrangement of elements of FIG. 1. However, the reader may find the specific references useful in understanding call processing functions from the viewpoint of one example of an LCS subscriber 10.

NAM Downloading and a Self-Actuating LCS Service (OATS)

In order for the subscriber to actuate their LCS service, they must be in their selected HNZ. For example, new subscriber MS 10 must be in the boundaries of their HNZ 105-1. Subscriber MS 10 then turns on their MS and enters their feature code and/or PIN. (The PIN may be used in a similar manner to the manner that PIN's are presently used in wireless services generally, namely, to promote call security and prevent service piracy and, consequently, may be optional). The preamble consists of the MS locking onto the IBS 130-2, transmitting an IS-136 Origination message including the feature code/PIN to the IBS 130-2 and IBS 130-2 forwarding the message via RDT 178, GR303 link 185, and local switch 140-2 to its associated intelligent switch controller (NSP) 145-1. Since the ID 146-1, after the subscriber sign-up process is completed, they should have the subscriber profile stored for that subscriber including their feature code and/or PIN, the NSP 145-1 validates the MS by comparing the entered feature code and/or PIN with data stored in the ID 146-1. A further validation may include the comparison of a collected electronic serial number of the MS with an associated database entry. If there is no match of all or any of the two (or three), a message may be returned to suggest the subscriber contact LCS CSC 160. After the NSP 145-1 verifies that the subscriber profile is in the ID 146-1, it initiates OATS to activate the MS by sending the Configuration Data Request message to the MS via IBS 130-2. The MS responds with Configuration Data Response to the NSP 145-1 via IBS 130-2. Altogether the preamble and the configuration data request and response comprise process step "a" shown.

As shown in FIG. 3 step b, once a download request message is received by MS, a download response requesting a download is transmitted to NSP 145-1. This message includes a request for the downloading of all algorithms and data necessary for LCS service including a number assignment module (NAM) giving the MS its subscriber opted-for address (MIN or DN). After the NSP receives the download response message, step "c" begins and a NAM commit request message is transmitted to the MS. This message instructs the MS to program/populate and commit a designated number assignment module area of memory (NAM(x)) with the downloaded data. If a subscriber decides to use their directory number as the number to be called, NAM(x) will be designated for LCS DN programming, and likewise if the subscriber decides to use their MIN as their reach number, NAM(x) will be designated for LCS MIN programming. Now the registration processes will be discussed for each of the options of MIN or DN based LCS service and when either must register in a visiting neighborhood zone to which the subscriber has subscribed. These processes are carried out in real-time.

Registration Process for a MIN-Based Ms

Figure 4A:
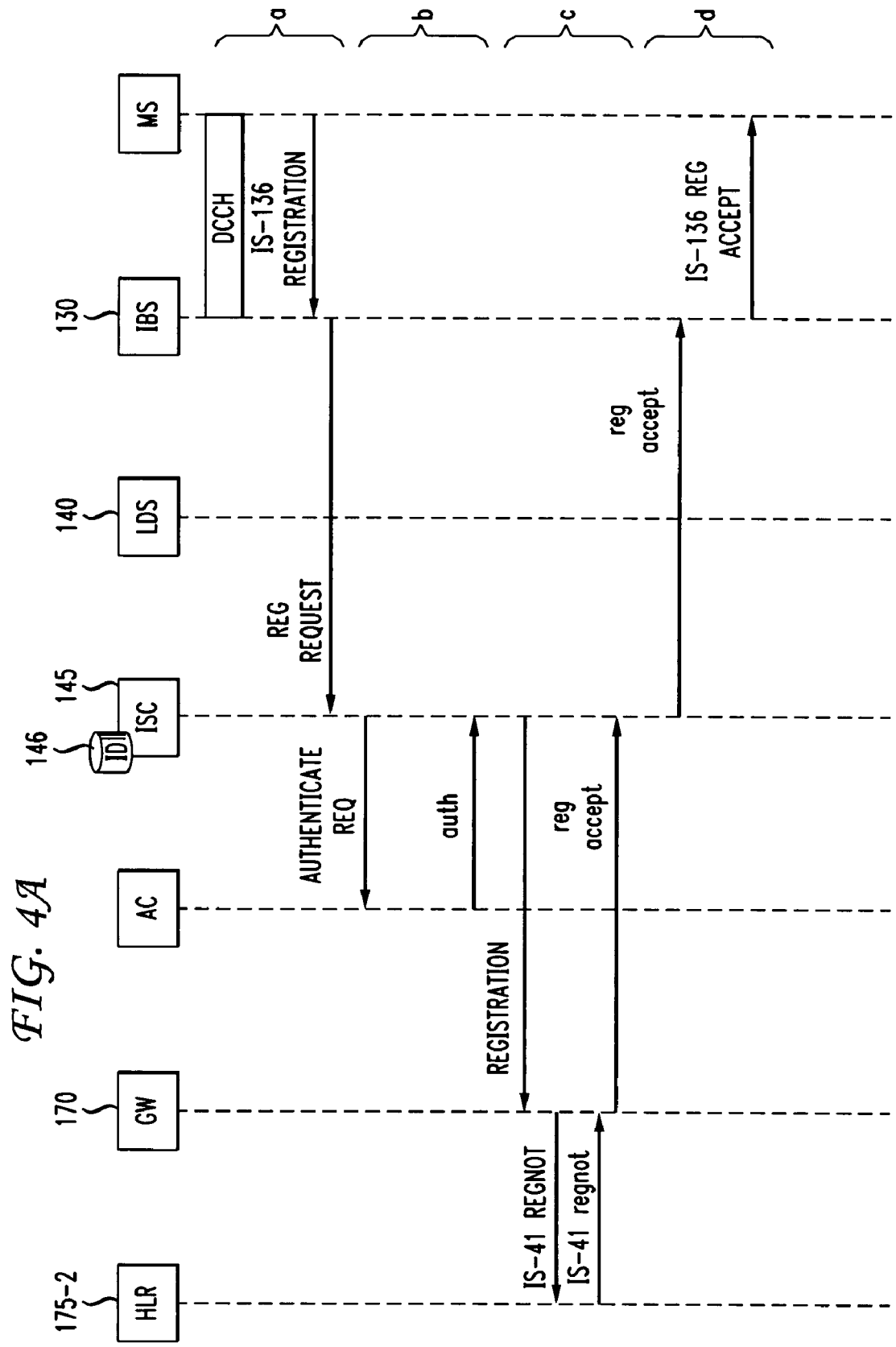
FIG. 4d shows an exemplary call processing flow for registration of a mobile station with a mobile identification number (MIN) in its associated home neighborhood zone (HNZ).
FIG. 4b shows an exemplary call processing flow for registration of a mobile station with a directory number (DN) in its associated home neighborhood zone (HNZ).
FIG. 4c shows an exemplary call processing flow for registration of a DN-based mobile station in a subscribed-to visiting neighborhood zone (VNZ).

Referring to FIG. 4a, there are shown steps "a", "b", "c", and associated with registration processes for a MIN-based subscriber in their home neighborhood zone. In step "a", the DCCH process consists of IBS 130 broadcasting system-wide and IBS 130 specific parameters (such as system and IBS 130 identification) on its DCCH and the MS 10 locking onto the DCCH when the MS 10 powers up. The MS 10 sends an IS-136 registration message to the IBS 130. IBS 130 forwards the registration message to its associated NSP 145 via the LCS local switch 140. This message contains IS-136 registration data.

In step "b", the home zone NSP 145 checks the MS's status with its Intelligent Database (ID) 146 and determines that the MS 10 is a valid MIN-based LCS service subscriber. Since the MS 10 is MIN-based, NSP must interact with the WS HLR for the registration process. If the optional MS authentication is required (this is determined by the LCS service provider and indicated to the MS 10 as one of the DCCH broadcast parameters), the MS IS-136 Registration message will include the authentication information. The NSP 145 will initiate the authentication procedure with LCS AC 140 by sending an authentication message via router 165. The NSP 145 sends an IP-based message containing IS-41-like authentication information to the LCS AC. After successful authentication of the MS 10, the LCS AC sends an IP-based IS-41-like authreq message back to the NSP 145.

In step c, after successful MS authentication, or if no authentication is required, NSP 145 must register the MS by sending a registration message to the WS HLR 175-2 via gateway 170 to update the MS's new location for call delivery purposes. The NSP 145 sends a TCP/IP-based message containing IS-41-like registration information to the TCP/IP to SS7 Gateway (GW) 170. The GW 170 receives the registration message which also includes the NSP's unique IP address, translates the message into an SS7/TCAP/IS-41 REGNOT message and sends it to the HLR 175-2.

After a successful registration, the HLR 175-2 sends an SS7/TCAP/IS-41 regnot message back to the GW 170. The GW receives the IS-41 regnot message, translates the message into a TCP/IP based registration accept message. Since the GW 170 stores each NSP 145 unique IP address based on information gathered during MS registration message, the GW sends the registration accept message back to NSP 145 based on the NSP's unique IP address. The NSP 145 processes the registration accept message and sends it to the IBS 130. NSP 145 notes that the mobile is successfully registered and active.

In step d, the IBS 130 sends an IS-136 Reg. Accept message to the MS to complete the MS registration procedures.

There are two possibilities when a MIN-based MS 10 registers in a VNZ 115. The first one is where the VNZ and the HNZ are covered by the same NSP (cell 101-2 in FIG. 1 comprising NSP 145-1, HNZ 105-1 and VNZ 115-1). The second is where the VNZ and the HNZ are covered by different NSPs (HNZ 105-1 and VNZ 115-2). As far as the LCS system is concerned, both MIN-based registration signaling flows are the same as discussed in the previous section (MIN-based MS registered in the HNZ). The HLR 175-2 is updated when the latest registration location occurs regardless of whether the MS 10 is in the HNZ or the VNZ.

Registration Process for a DN-Based MS

Figure 4B:
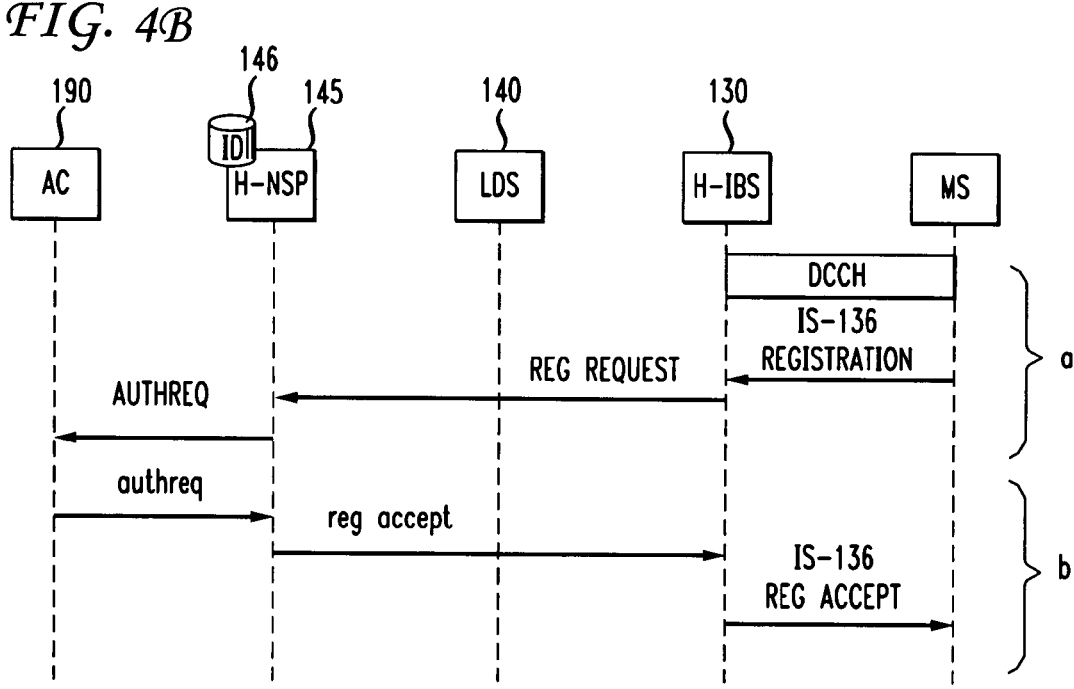

Referring to FIG. 4b, there is depicted the signaling flow scenario of an MS that uses an assigned directory number (DN) or a ported ILEC DN as the number to be used in the subscribed-to neighborhood LCS zones. Since the MS is DN-based, there is no requirement for interaction with an HLR 175-2 during registration. During service activation, the subscriber's profile is downloaded to every NSP/ID that covers the subscribed-to zones, the HNZ and any subscribed-to VNZs. The subscriber has already activated the LCS service via OATS.

The signaling flow shown in FIG. 4b describes the scenario where a DN-based MS registers that requires just two steps "a" and "b". In step "a," the DCCH process consists of H-IBS 130 broadcasting system-wide and H-IBS 130 specific parameters (such as system and H-IBS 130 identification) on its DCCH and the MS locking onto the DCCH when the MS powers up. The MS sends an IS-136 registration message to the home zone H-IBS 130. The H-IBS 130 forwards the registration message to the H-NSP 145 via the LCS local switch 140. This message contains IS-136 registration data.

In step "b", the H-NSP 145 checks the MS=s status with the Intelligent Database (ID) 146 which already has the subscriber profile, determines that the MS is a valid DN-based LCS subscriber. If the optional authentication procedure is required (as determined by the LCS service provider), the H-NSP 145 sends an IS-41-like AUTHREQ message in IP format to the LCS Authentication Center (AC) 190 in order to authenticate the mobile. When the authentication process is successful, the AC 190 returns an authentication response message to the H-NSP 145. The H-NSP 145 sends the reg. accept message to the H-IBS 130. The H-IBS 130 sends an IS-136 Reg. Accept message to the MS to complete the MS registration procedures.

When a LCS subscriber roams or otherwise moves to a subscribed-to visiting zone, as far as the subscriber is concerned, the same DN number will be used for all call delivery (i.e., roaming-like situation). A dynamically assignable FDN, described previously, is used to terminate the call.

Figure 4C:
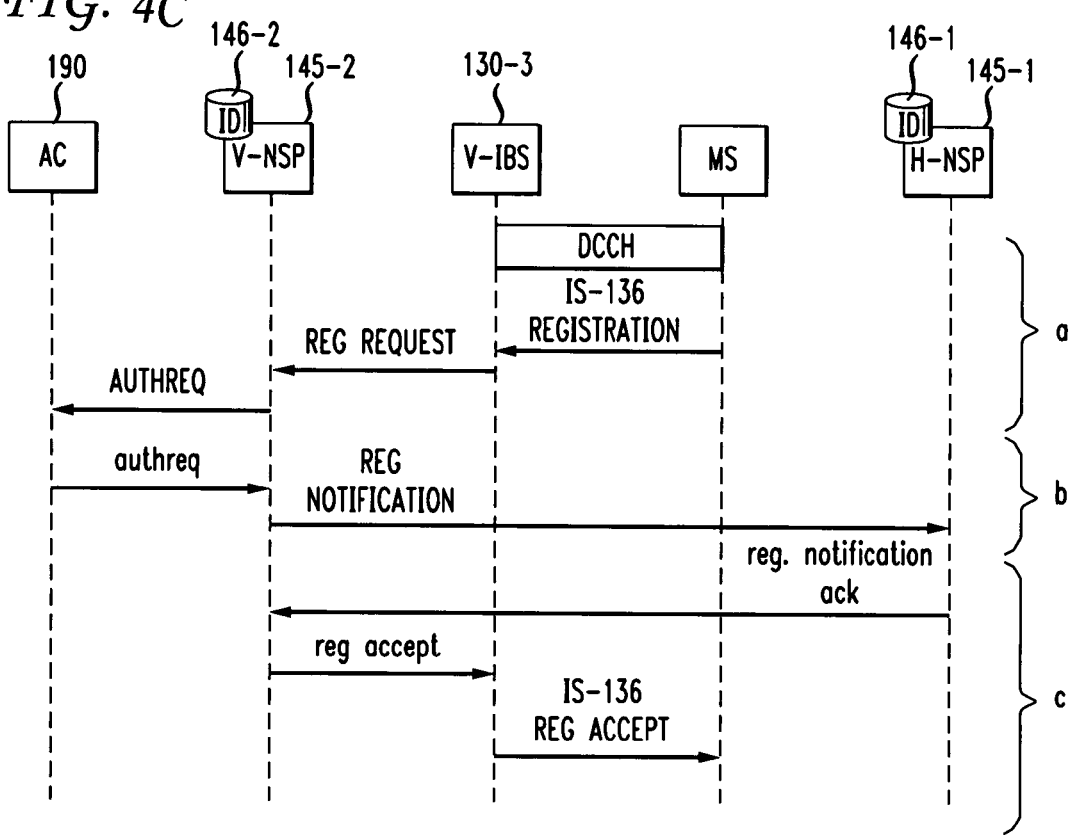

Referring to FIG. 4c, three steps are required to process a registration of a DN-based MS in a VNZ. In step "a", the DCCH process consists of V-IBS 130-3 broadcasting system-wide and V-IBS 130-3 specific parameters (such as system and V-IBS 130 identification) on its DCCH and the MS locking onto the DCCH when the DN-based MS powers up. The MS sends an IS-136 registration message to the visited V-IBS 130. V-IBS 130, for example, V-IBS 130-3, forwards the REG. REQUEST message to the V-NSP 145-2 via the LCS local switch 140-1. This message contains IS-136 registration data.

In step "b" the V-NSP 145-2 checks the MS's status with the Intelligent Database ID 146-2 which has the subscriber profile previously downloaded by the LCS CSC 160 and determines that the MS is a valid DN-based LCS subscriber. The V-NSP 140-1 sends an IS-41-like authreq message in IP format to the AC 190 for subscriber authentication. The AC 190 validates the subscriber with its internal database and returns an authreq response message back to the V-NSP 145-2.

In step "c", the V-NSP 145-2 sends a registration notification message to H-NSP 145-1 to indicate the new location of the MS for proper delivery of incoming calls to the MS. The H-NSP 145-1 records the current MS location as being in a subscribed-to visiting zone 115-2. The H-NSP 145-1 sends a reg. notification response message to the V-NSP 145-2. In return, the V-NSP 145-2 sends registration accept message to the V-IBS 130-3. V-IBS 130-3 sends an IS-136 Reg. Accept message to the visiting MS to complete the registration process.

Call Delivery to an LCS Subscriber

Call processing of a call to or from a subscriber visiting a neighborhood zone involves the utilization of one, two or more reserved forwarding directory numbers (FDN's) in the visited zone. For example, the subscriber 10 that visits VNZ 115-2 will be dynamically assigned one of these reserved FDN's while they are in the visited zone. These same FDN's may be used by another subscriber when that subscriber visits the zone from their home zone after the first subscriber no longer needs it.

Figure 5A:
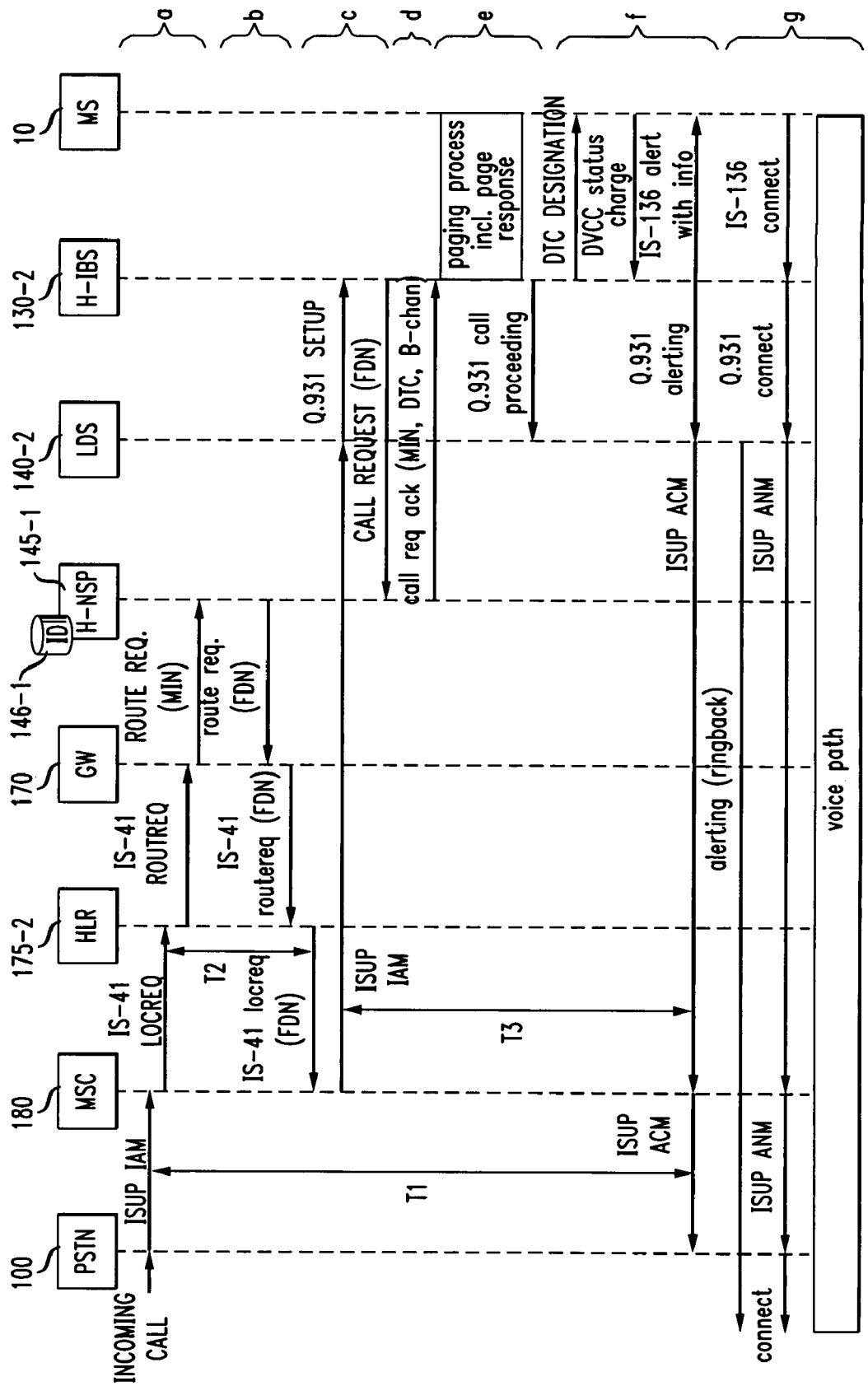
FIG. 5a shows an exemplary call processing flow for a call delivered to a mobile station with a mobile identification number (MIN).

The call delivery process from an originating switch in the PSTN 100 to a MIN-based LCS subscriber are shown in FIG. 5a. To the extent possible, similar reference characters are borrowed from FIG. 1 to represent similar elements for an incoming call to subscriber MS 10. Process step "a" takes the incoming call request to the home zone NSP 145-1. The PSTN switch 140-3 of PSTN 100 processes the MIN-based incoming call and sends an ISUP Initial Address Message (IAM) to a PSTN-based MSC 180. The MSC 180 provides services and coordination between mobile users in the public cellular network and between the mobile users and the external network such as PSTN 100. When a PSTN user dials a MIN, the PSTN local switch LDS will always route the call to the MCS switch for call delivery. One way to look at the phone networks including PSTN 100, public cellular network and LCS is that all the switches from each network are fully connected and they all have connection to the Common Signaling Network Number 7 (SS7). The Mobile Switching Center, MSC 180, provides switching functions for the cellular network and coordinates the establishments of calls to and from cellular/DPCS subscriber. The MSC interfaces with the cellular network(s) and the public switch networks. Since the MSC does not have the MIN-based user currently registered, the MSC sends a SS7/TCAP/IS-41 location request (LOCREQ) message to HLR 175-2. The HLR 175-2 knows the current registration location of the MIN-based MS because of prior registration notification from the home zone NSP (H-NSP) 145-1 via the gateway (GW) 170. HLR 175-2 sends a SS7/TCAP/IS-41 route request (ROUTREQ) message to the H-NSP 145-1 via the GW 170 for routing instructions to the MS 10. The GW 170 translates the message to an IP message and sends it to the H-NSP 145-1 (ROUTE REQ (MIN)). This completes process step "a".

Process step "b" involves letting the MSC 180 know the result. The H-NSP 145-1 verifies that the MS 10 is still registered in the home zone and is presently idle. H-NSP 145-1 reserves an available forward directory number (FDN) and a B-channel for its transmission in the home zone IBS (H-IBS) 130-2. Then, H-NSP 145-1 returns a route request response message including the reserved FDN to the GW 170. If no FDN is available, of course, the H-NSP 145-1 rejects the request. Continuing a favorable call-completion scenario, the GW 170 translates the IP message to a SS7/TCAP/IS-41 routreq response message and sends it to the HLR 175-2. This completes process "b".

Process step "c" takes the call from HLR 175-2 to a set-up request of H-IBS 130-2. The HLR returns the reserved FDN information in the IS-41 TCAP locreq response message to the MSC. The MSC initiates call setup by sending an ISUP IAM message to the LCS switch (LDS) 140-2 based on the FDN. The LCS switch (LDS) 140-2 sends a Q.931 call setup message to the H-IBS 130-2 based on the reserved DN. This concludes process "c".

Process step "d" relates to acknowledgment. The H-IBS 130-2 sends a call request message to the H-NSP 145-2 to validate the call request. Note: H-NSP 145-1 may initiate IS-136 authentication procedure when necessary. The H-NSP 145-1 uses the ID database 146-1 to locate the record of FDN-to-MIN mapping to validate the call. If the request is valid and RF resources are available, H-NSP 145-2 will reserve a digital traffic channel (DTC) for call delivery. H-NSP 145-1 then sends a call request ack message with the MIN, DTC, and B-channel (reserved when the FDN was assigned to the call) to the H-IBS 130-2. If the call request is not valid or no resources are available, the H-NSP 145-2 will return a call request nack (stands for negative acknowledgment) and the H-IBS 130-2 will release the call. This concludes process "d".

In process step "e", the H-IBS 130-2 starts to page the MIN-based MS 10. H-NSPH-IBS (Note: The IS-136 MS paging process is as follows: the H-IBS 130-2 broadcasts an IS-136 page for the MIN-based MS 10. The MS 10 must respond with an IS-136 page response message within a specified time period. If the MS 10 does not respond, the H-IBS 130-2 will release the call.) After the MS 10 successfully responds to the page, the H-IBS 130-2 sends a Q.931 call proceeding message to the LCS switch 140-2.

In process step "f", the H-IBS 130-2 sends a DTC designation message to the MS 10 and verifies the MS is on the DTC by monitoring the returning DVCC code status change. After the MS 10 locks onto the DTC (DVCC status change), the H-IBS 130-2 sends an IS-136 alert with info message to the MS 10 to initiate a ringing indication to the user. H-IBS 130-2 also sends a Q.931 alert message to the LCS switch 140-2. The LDS 140-2 sends an ISUP address complete message (ACM) to the MSC to complete the end-to-end call connection. The MSC sends an ISUP ACM message to the PSTN 100.

Process step "g" is similar to a cellular/DPCS connect process. The LCS local switch 140-2 generates alerting (ring back tone) to the originating user. When the MIN-based user 10 picks up the call and the MS 10 sends an IS-136 connect message to the H-IBS 130-2, the H-IBS 130-2 sends a Q.931 connect message to the LCS local switch (LDS) 140-2. The LCS switch 140-2 sends an ISUP address answer message (ANM) to the MSC. The MSC sends an ISUP ANM message to the PSTN switch 140-3, the PSTN switch 140-3 connects the caller and thus the voice path is established and completes the call delivery process.

Call Delivery to a DN-Based Subscriber, the DN being Assigned for LCS

Figure 5B:
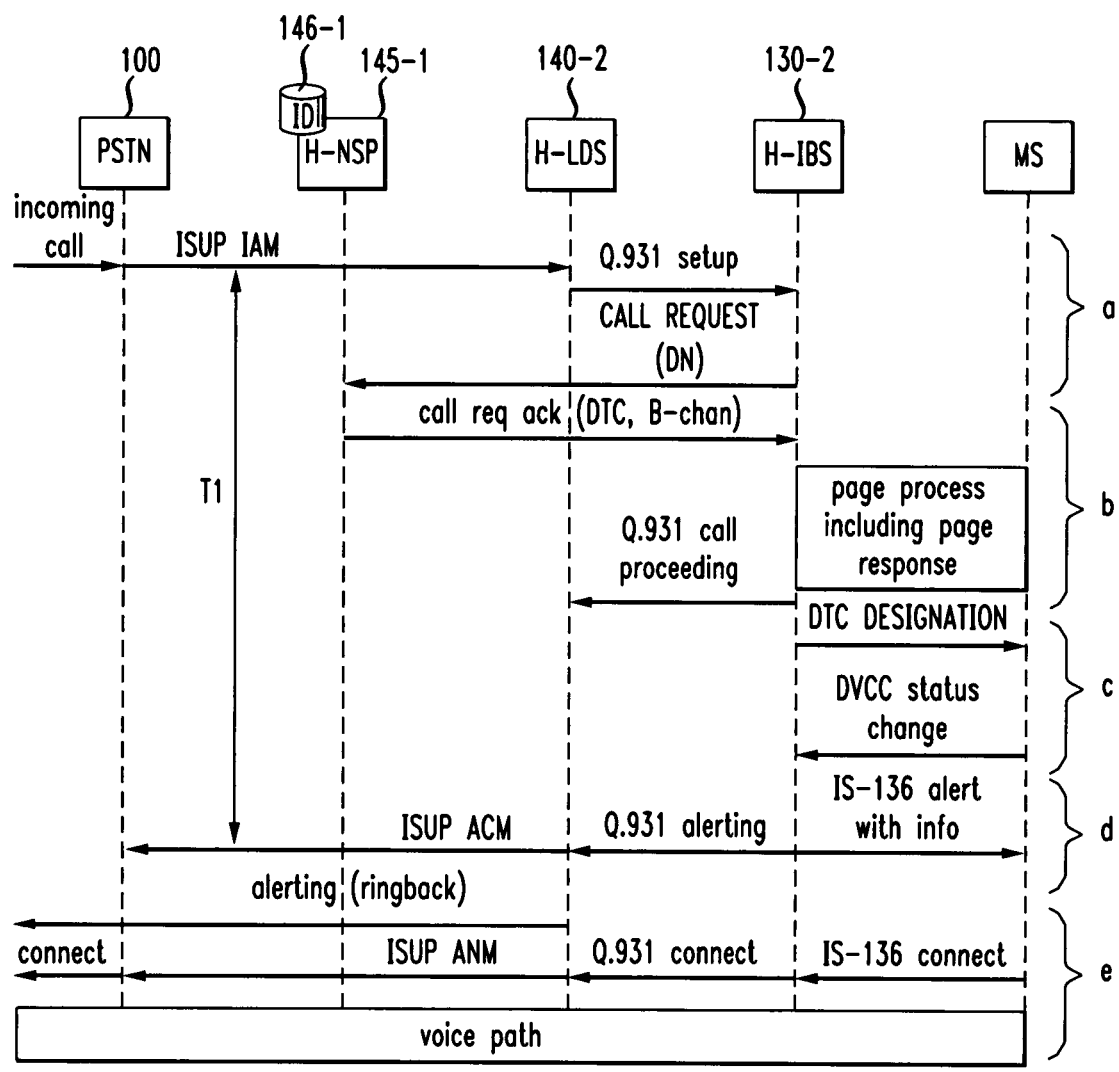
FIG. 5b shows an exemplary call delivery to a DN-based subscriber in the HNZ via the home IBS.

FIG. 5b describes the signaling flow scenario of a PSTN caller dialing the LCS subscriber's DN when the DN is registered with the H-IBS in the HNZ. In step "a", an originating PSTN switch (somewhere in PSTN 100) processes the DN-based incoming call and sends an ISUP IAM message to the HNZ LCS local switch (H-LDSH-LDS) 140-2 based on the DN dialed. The H-LDS 140-2 sends a Q.931 call setup message to the H-IBS 130-2 based on the DN dialed. The H-IBS 130-2 sends a CALL REQUEST message to the H-NSP 145-1 to validate the call request. The H-NSP 145-1 may initiate an authentication procedure with an AC 190 when and if necessary.

In step "b", the H-NSP 145-1 validates the call by searching the ID 146-1 and discovers that the MS is registered in its home IBS, H-IBS 130-2. If the request is valid and resources are available, H-NSP 145-1 will reserve a DTC and a B-channel. H-NSP 145-1 then sends a call request ack message with the resource information to the H-IBS 130-2. H-IBS 130-2 starts to page the DN-based MS. If the call request is not valid or no resources are available, the H-NSP 145-1 will return a call request nack and the H-IBS 130-2 will reject the call.

The IS-136 MS paging process is as follows: the H-IBS 130-2 broadcasts an IS-136 page for the DN-based MS. The MS must respond with an IS-136 page response within a specified time period. If the MS does not respond, the H-IBS 130-2 will release the call.

After successfully paging the MS, the H-IBS 130-2 then sends a Q.931 call proceeding message to the H-LDSH-LDS 140-2. This connects the B-channel to the H-LDS 140-2.

In step "c", the H-IBS 130-2 sends a DTC designation message to the MS and verifies the MS is on the DTC by monitoring the returning DVCC code status change.

In step "d", after the MS locks onto the DTC (DVCC status change), the H-IBS 130-2 sends an IS-136 alert with info message to the MS to initiate ringing indication to the user. It also sends a Q.931 alert message to the LCS switch, H-LDS 140-2. The H-LDS 140-2 sends an ISUP address complete message (ACM) to the PSTN switch to complete the end-to-end connection. The H-LDS 140-2 generates alerting (ringback tone) to the originating user.

In step "e", when the DN-based MS user picks up the call, the MS sends an IS-136 connect message to the H-IBS 130-2. The H-IBS 130-2 sends a Q.931 connect message to the H-LDS 140-2. The H-LDS 140-2 sends an ISUP address answer message (ANM) to the PSTN switch, the PSTN switch connects the caller and thus the voice path is established, completing the incoming call delivery process.

Figure 5C:
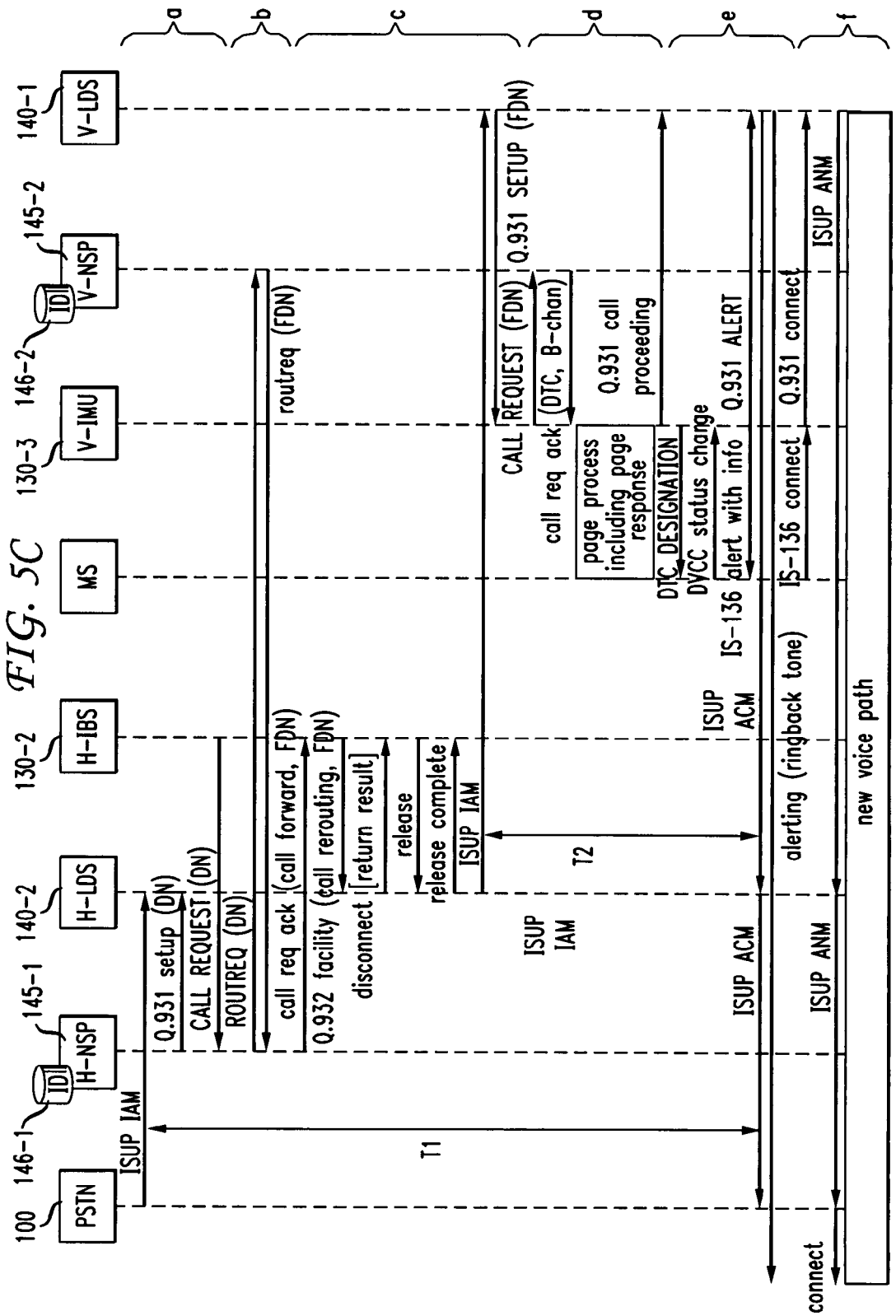
FIG. 5c shows an exemplary call delivery to a visiting neighborhood zone for a DN-based subscriber registered with the visited V-NSP.

The called MS's DN may be registered with a visited V-NSP, for example, V-NSP 145-2 in the VNZ 115-2. Referring to FIG. 5c, step "a", the originating PSTN switch processes the DN-based incoming call by sending an ISUP Initial Address Message (IAM) to the H-LDS 140-2 based on the DN dialed. The H-LDS 140-2 sends a Q.931 call setup message to the H-IBS 130-2 based on the DN dialed. The H-IBS 130-2 sends a CALL REQUEST message to the H-NSP 145-1 to validate the call request. The H-NSP 145-1 may initiate authentication procedure when necessary with AC 190.

In step "b", the H-NSP 145-1 validates the call by searching the ID 146-1 and discovers that the MS is currently registered in a subscribed-to VNZ (V-NSP) 115-2. Consequently, H-NSP 145-1 sends an IS-41-like ROUTREQ message in IP format to the V-NSP 145-2 for routing instructions to the DN-based MS. The V-NSP 145-2 confirms via ID 146-2 that the MS is still registered and idle in V-IBS 130-3. It reserves an available FDN from V-IBS 130-3, and returns a route request response message including FDN to the H-NSP 145-1. The V-NSP 145-2 also reserves a B-channel for the FDN. If no FDNs are available, V-NSP 145-2 rejects the call which ultimately results in rejecting the call to the originating user. The H-NSP 145-1 sends call req ack to the H-IBS 130-2 with an indication to forward the call to the FDN from V-NSP 145-2.

In step "c", the H-IBS 130-2 sends a Q.932 facility message to the H-LDS 140-2 to reroute the call to the forward FDN. The H-LDS 140-2 sends the facility return result in a disconnect message for response to the facility invoke message to the H-IBS 130-2; on receipt of the disconnect message, the H-IBS 130-2 sends a release message to the H-LDS 140-2, and the H-LDS 140-2 sends a release complete message in return. Immediately after sending the disconnect message, the H-LDS 140-2 sends an ISUP IAM message to the V-LDS 140-1 based on the FDN.

In step "d", the V-LDS 140-1 now has the call. The V-LDS 140-1 sends a Q.931 call setup message to the V-IBS 130-3 based on the FDN. The V-IBS 130-3 sends a call request message to the V-NSP 145-2 to validate the call request. The V-NSP 145-2 may initiate authentication procedures with AC 190 when necessary. The V-NSP 145-2 uses the ID 146-2 database to locate the record of FDN-to-DN mapping to validate the call. If the request is valid, and RF resources are available, the V-NSP 145-2 reserves the RF resource, the DTC, for call delivery. The V-NSP 145-2 then sends a call request ack message with the DTC and B-channel (reserved when the FDN was assigned to the call) to the V-IBS 130-3. The V-IBS 130-3 starts to page the DN-based MS (the paging process is described above in respect to FIG. 5b, step "b"). If the call request was not valid or if no resources are available, the V-NSP 145-2 will return a call req nack and the V-IBS 130-3 will release the call. The V-IBS 130-3 sends a Q.931 call proceeding message to the V-LDS 140-1 after successfully paging the MS. This connects the B-channel to the V-LDS 140-1.

In step "e", the V-IBS 130-3 sends a DTC designation message to the MS and verifies the MS is on the DTC by monitoring the returning DVCC code status change. After the MS locks onto the DTC (DVCC code status change), the V-IBS 130-3 sends an IS-136 alert with info message to the MS to indicate ringing to the user. The V-IBS 130-3 also sends a Q.931 alert message to the V-LDS 140-1. The V-LDS 140-1 sends an ISUP address complete message (ACM) to the H-LDS 140-2 and the H-LDS 140-2 sends an ISUP ACM message to the PSTN 100 to complete the end-to-end connection. The V-LDS 140-1 generates alerting (ringback tone) to the originating user.

In step "f", when the DN-based visiting subscriber picks up the call, the MS sends an IS-136 connect message to the V-IBS 130-3. The V-IBS 130-3 sends a Q.931 connect message to the V-LDS 140-1. The V-LDS 140-1 sends an ISUP address answer message (ANM) to the H-LDS 140-2 and the H-LDS 140-2 sends an ISUP ANM message to the PSTN switch. The PSTN switch connects the caller and thus the new VNZ voice path is established.

Call Delivery to a DN-Based Subscriber, the DN being a Ported Number from ILEC

Figure 5D:
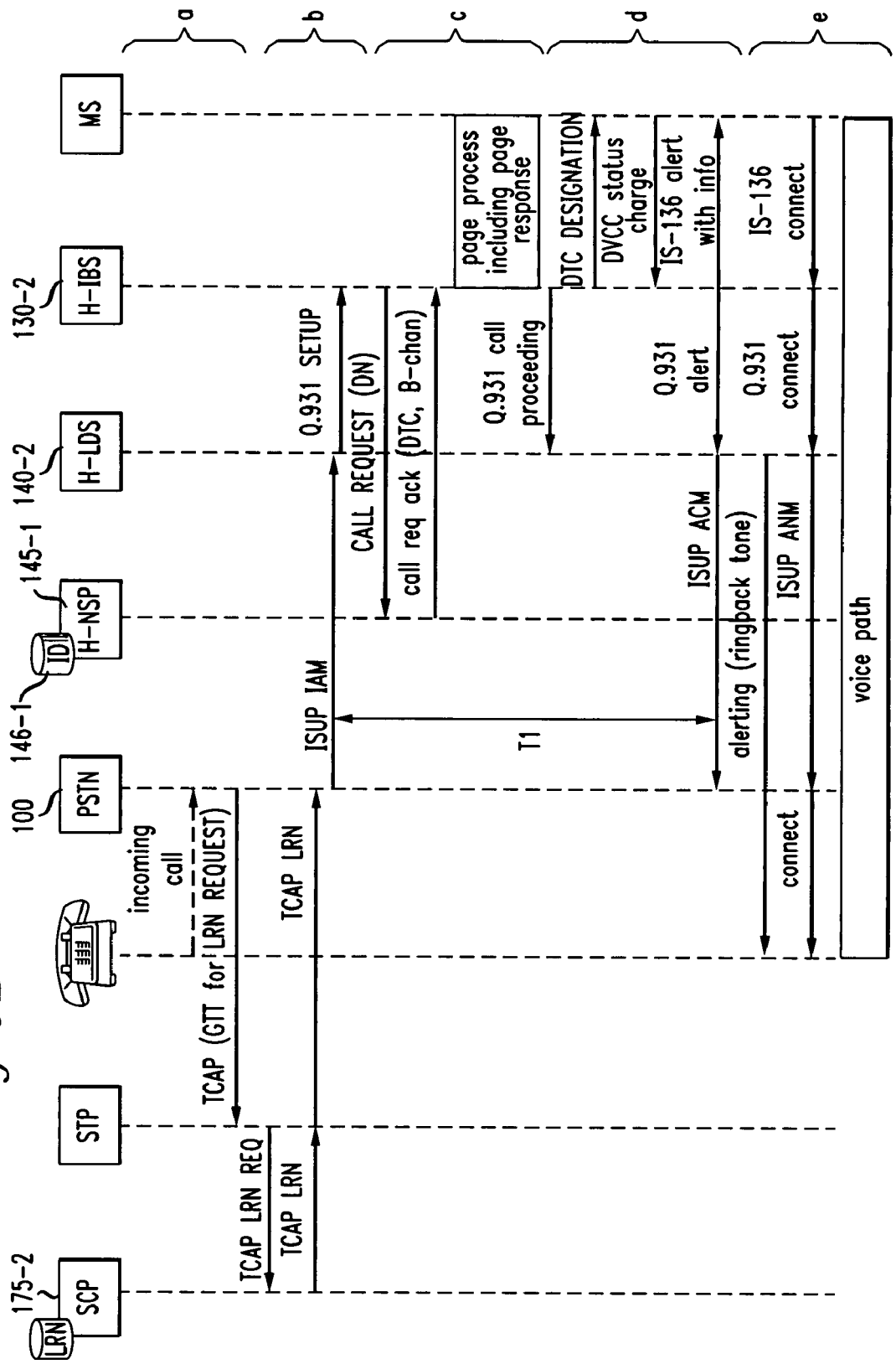
FIG. 5d shows an exemplary call processing for a ported DN based subscriber in their HNZ.

FIG. 5d describes the signaling flow scenario of a PSTN caller dialing the DN-based LCS subscriber when the called MS's DN is a ported number from ILEC. As already described, LCS subscribers may carry their existing residential landline phone numbers to the subscribed HNZ for LCS services. The MS is registered with the H-IBS 130-2 in the HNZ 105-1. In step "a", the originating PSTN switch receives a call with a ported DN; so the PSTN switch sends a TCAP LRN REQUEST message to the STP for a 6-digit LRN Global Title Translation (GTT) for call routing information. The STP performs GTT on the DN to determine the point code of the appropriate SCP database and sends a TCAP LRN routing instruction request to the SCP. The SCP's LRN application does 10-digit translation to determine the LRN of the terminating office and sends an LRN reply message to the originating PSTN switch based on the originating point code in the incoming message. The STP forwards the LRN reply to the PSTN switch without changing any protocol elements.

In step "b", the originating PSTN switch receives the LRN reply message, processes the message and uses the information for call routing. The PSTN switch sends an ISUP IAM message to the HNZ LCS local switch (H-LDS) 140-2 based on the LRN reply. The H-LDS 140-2 sends a Q.931 call setup message to the H-IBS 130-2 based on DN.

In step "c" the H-IBS 130-2 sends a CALL REQUEST message to the H-NSP 145-1 to validate the call request. The H-NSP 145-1 may initiate an authentication procedure with AC 190 when necessary. The H-NSP 145-1 validates the call request by searching the ID 146-1 and discovers that the MS is currently registered in its H-IBS 130-2. If the request is valid and resources are available, H-NSP 145-1 will reserve the DTC and the B-channel. H-NSP 145-1 then sends a call request ack message with the resource information to the H-IBS 130-2. H-IBS 130-2 starts to page the DN-based MS. If the call request is not valid or no resources are available, the H-NSP 145-1 will return a call request nack and the H-IBS 130-2 will reject the call. The IS-136 MS paging process has already been described above.

In step "d" the H-IBS 130-2 sends a Q.931 call proceeding message to the H-LDS 140-2 after successfully paging the MS. This connects the B-channel to the H-LDS 140-2. The H-IBS 130-2 sends a DTC designation message to the MS and verifies the MS is on the DTC by monitoring the returning DVCC code status change. After the MS locks onto the DTC (DVCC status change), the H-IBS 130-2 sends an IS-136 alert with info message to the MS to indicate ringing to the user. H-IBS 130-2 also sends a Q.931 alert message to the H-LDS 140-2. The H-LDS 140-2 sends an ISUP address complete message (ACM) to the originating PSTN switch to complete the end-to-end connection.

In step "e" the H-LDS 140-2 generates the alerting (ring back tone) to the originating user. When the DN-based MS user picks up the call, the MS sends a IS-136 connect message to the H-IBS 130-2. The H-IBS 130-2 sends a Q.931 connect message to the H-LDS 140-2. The H-LDS 140-2 sends an ISUP address answer message (ANM) to the PSTN switch, the PSTN switch connects the caller and thus the voice path is established, completing the call delivery process.

Figure 5E:
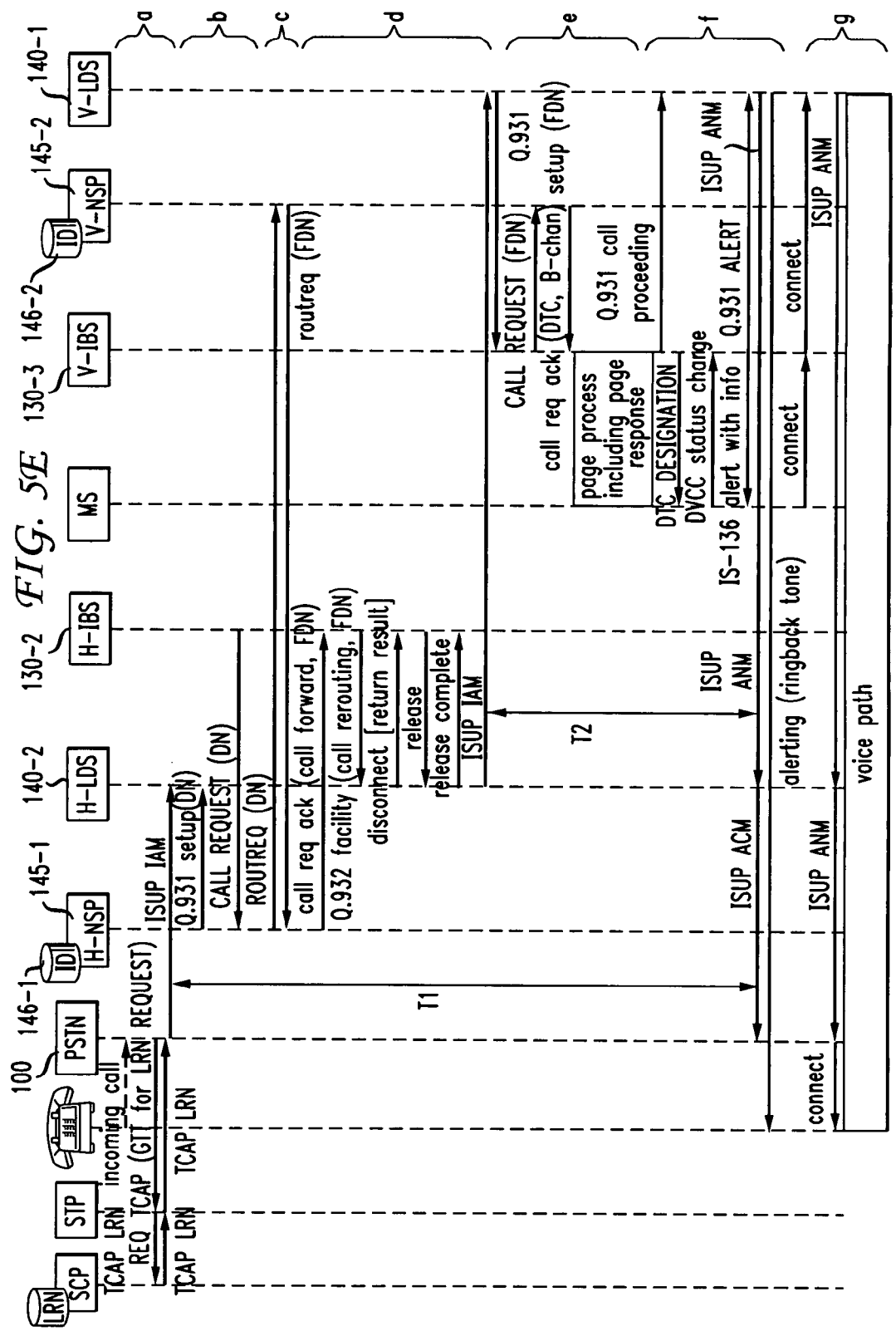
FIG. 5e shows an exemplary call processing for a ported DN based subscriber in a visited zone.

The MS with a DN carried from a local exchange carrier (LEC) may be registered in the VNZ, for example, VNZ 115-2. Referring to FIG. 5e, step "a", the originating PSTN switch receives a call with a ported DN and the PSTN switch sends a TCAP LRN REQUEST message to the STP for a 6-digit LRN Global Title Translation (GTT) for call routing information. The STP performs GTT on the DN to determine the point code of the appropriate SCP database and sends a TCAP LRN routing instruction request to the SCP. The SCP's LRN application does a 10-digit translation to determine the LRN of the terminating office, sends a LRN reply message to the PSTN switch based on the originating point code in the incoming message. The STP forwards the LRN reply to PSTN switch without changing any protocol elements.

In step "b", the originating PSTN switch receives the LRN reply message, processes the message and uses the information for call routing. The PSTN switch sends an ISUP IAM message to the HNZ LCS local switch (H-LDS) 140-2 based on LRN reply. The H-LDS 140-2 sends a Q.931 setup message to the H-IBS 130-2 based on the DN. The H-IBS 130-2 sends a CALL REQUEST message to the H-NSP 145-1 to validate the call.

In step "c", the H-NSP 145-1 validates the call by searching the ID 146-1, and discovers that the MS is registered in a subscribed VNZ (V-NSP) 115-2. It sends an IS-41-like ROUTREQ message in IP format to the V-NSP 145-2 for routing instructions to the DN-based MS. The V-NSP 145-2 verifies via the ID 146-2 that the MS is still registered and is idle in V-IBS 130-3. It reserves an available FDN from V-IBS 130-3, and returns a route request response message including FDN to the H-NSP 145-1. The V-NSP 145-2 also reserves a B-channel for the FDN. If no FDNs are available, the V-NSP 145-2 rejects the call which ultimately results in rejecting the call to the originating user.

In step "d", the H-NSP 145-1 sends a call req ack message to the H-IBS 130-2 with an indication to forward the call to the FDN from the V-NSP 145-2. The H-IBS 130-2 sends a Q.932 facility message to the H-LDS 140-2 to reroute the call to the DN-based MS using FDN. The H-LDS 140-2 sends the facility return result in a disconnect message for response to the facility invoke message to the H-IBS 130-2; on receipt of the disconnect message, the H-IBS 130-2 sends a release message to the H-LDS 140-2, and H-LDS 140-2 sends a release complete message in return. Immediately after sending the disconnect message, the H-LDS 140-2 sends an ISUP IAM message to the V-LDS 140-1 based on the FDN.

In step "e", the V-LDS 140-1 now has the call. V-LDS 140-1 sends a Q.931 setup message to the V-IBS 130-3 based on the FDN. The V-IBS 130-3 sends a call request message to the V-NSP 145-2 to validate the call. As before, the VH-NSP 145-2 may initiate authentication procedures via an authentication center when and if necessary. The V-NSP 145-2 uses the ID database 146-2 to locate the record of FDN-to-DN mapping to validate the call. If the request is valid and resources are available, V-NSP 145-2 will reserve the DTC and the B-channel (reserved when the FDN was assigned to the call). V-NSP 145-2 then sends a call request ack message with the resource information to the V-IBS 130-3. V-IBS 130-3 starts to page the DN-based MS. If the call request is not valid or no resources are available, the V-NSP 145-2 will return a call request nack and the V-IBS 130-3 will reject the call. Briefly, the IS-136 MS paging process is as follows: the V-IBS 130-3 broadcasts an IS-136 page for the DN-based MS. The MS must respond with an IS-136 page response within a specified time period. If the MS does not respond, the V-IBS 130-3 will release the call. The V-IBS 130-3 sends a Q.931 call proceeding message to the V-LDS 140-1 after successfully paging the MS. This connects the B-channel to the V-LDS 140-1.

In step "f", the V-IBS 130-3 sends a DTC designation message to the MS and verifies the MS is on the DTC by monitoring the returning DVCC code status change. After the MS locks onto the DTC (DVCC status change), the V-IBS 130-3 sends an IS-136 alert with info message to the MS to indicate ringing to the user. It also sends a Q.931 alert message to the V-LDS. The V-LDS 140-1 sends an ISUP address complete message (ACM) to the H-LDS 140-2, and the H-LDS 140-2 sends an ISUP ACM message to the PSTN 100 originating switch to complete the end-to-end connection. The V-LDS 140-1 generates the alerting (ring back tone) to the originating user.

In step "g", when the DN-based visiting subscriber picks up the call, the MS sends an IS-136 connect message to the V-IBS 130-3. The V-IBS 130-3 sends a Q.931 connect message to the V-LDS 140-1. The V-LDS 140-1 sends an ISUP address answer message (ANM) to the H-LDS 140-2. The H-LDS 140-2 sends an ISUP ANM message to the PSTN switch. The PSTN switch connects the caller and thus the new voice path is established.

Advanced Intelligent Network triggers may also be used for call delivery for DN based MS. The LCS subscriber's DN is provisioned for the AIN Termination Attempt Trigger (TAT) in the serving LDS. When a call is delivered to the LDS for the subscriber's DN, the TAT is encountered and the LDS sends a call treatment query message to the NSP. The NSP locates the mobile in their serving IBS and reserves an FDN in this IBS. NSP then directs the LDS to deliver the call to the MS based on the FDN.

Figure 5F:
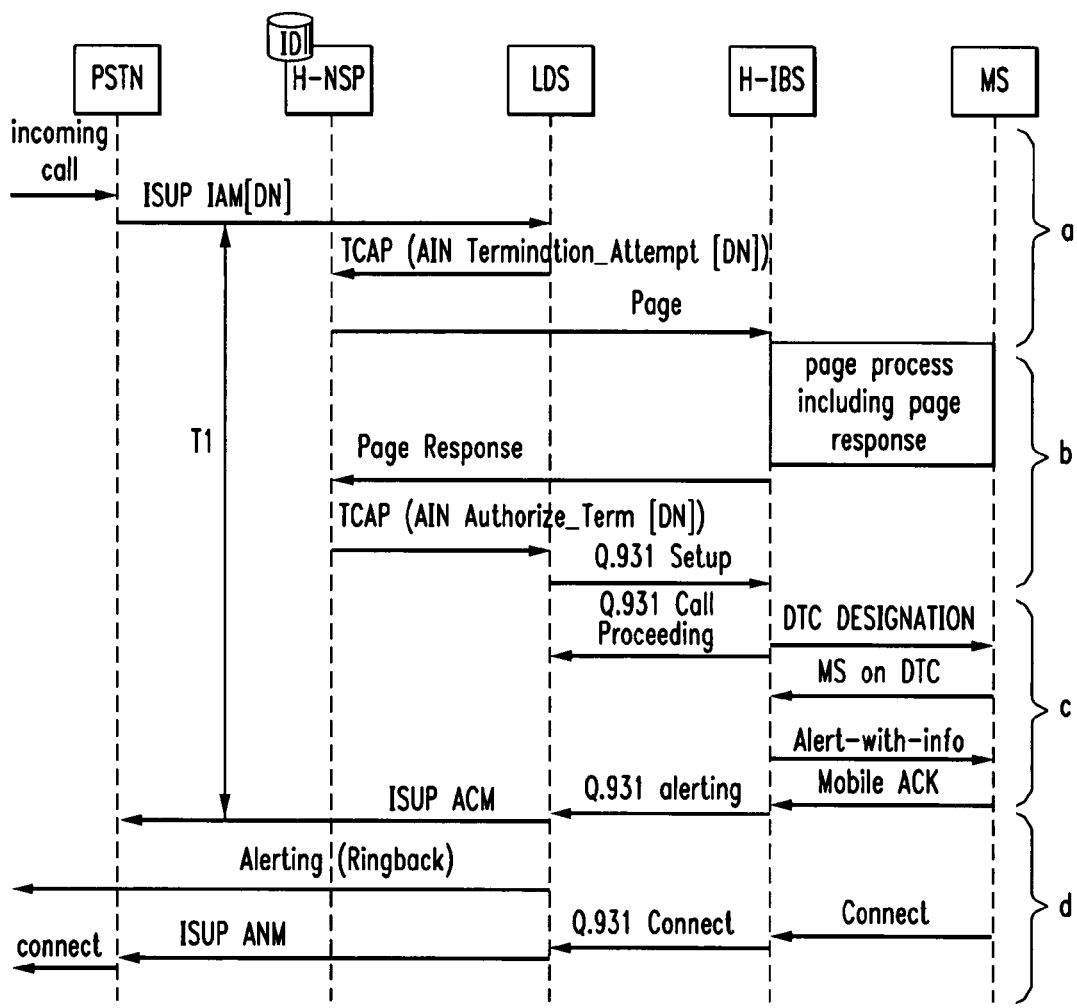
FIG. 5f shows an exemplary call delivery for a DN-based subscriber using the Advance Intelligent Network triggers.

Referring to FIG. 5f, step a, a PSTN user dials a LCS subscriber's DN. The LDS receives the ISUP IAM message from PSTN. The incoming call to a TAT provisioned DN directs the LDS to request for routing instructions from H-NSP. H-NSP finds that the subscriber's MS is active in an IBS, and pages the MS.

In step b, after the MS responds to the page, H-NSP directs LDS to forward the call to the FDN of the serving IBS.

In step c, LDS sends Q.931 Setup message to the IBS. IBS sends Digital Traffic Channel (DTC) Designation message to MS and sends Q.931 Call Proceeding message to the LDS. MS tunes to the traffic channel. IBS then detects the MS is on the traffic channel via DVCC status change. IBS alerts the MS and the MS acknowledges.

In step d, IBS sends ISDN Alerting message to LDS. When the MS answers, IBS sends ISDN Connect message to LDS. LDS then sends ISUP ANM message to PSTN switch and cuts through the voice path.

Call Hand-Off

Call hand-off encompasses a set of MS functions and network functions that enable an MS to move from one radio channel to another radio channel while a call is in progress.

There are four possible types of call hand-off involving the LCS system: intra-LCS intra-cell hand-offs; intra-LCS inter-cell hand-offs; hand-offs from the LCS system to the macro-cellular system; and hand-offs from the macro-cellular system to the LCS system. Intrasystem handoff is a handoff between two radio channels that are controlled by the same NSP. Intersystem handoff refers to the general procedures by which a call in progress on a radio channel under the control of the current serving cellular/PCS system may be automatically transferred to a different radio channel under the control of another cellular/PCS without interruption to the ongoing call.

Based on the received signal quality measurements, the MS, serving system, or both can determine that there is a need to perform a handoff to another channel or cell. These three strategies are known as MS-controlled handoff, Network-controlled handoff, and MS-assisted handoff (MAHO).

IS-41-C supports network-controlled handoff and MAHO only. Analog AMPS and NAMPS MSs do not provide signal measurements to support a handoff determination; thus they rely on network-controlled handoff techniques supported by IS-41-C. TDMA and CDMA MSs are able to provide measurements of received base station signal strength to the serving MSC without the need for the IS-41-C handoff measurement processes.

It is assumed that the macrocellular/PCS system is offering services based on the same standard, e.g., IS-136 TDMA, and therefore, intersystem handoff between LCS and the macro-cellular/PCS system will occur between the same radio channels, e.g., IS-136 TDMA. The IBS decides whether the handoff should be performed, based on the neighbor information and the RF measurement results.

Inter-System Hand-Off Between the LCS System and the Macro-Cellular System

For LCS, intersystem mobile assisted handoff (intersystem MAHO) occurs between the LCS system and the public macrocellular/PCS system. Intersystem handoff is a handoff between two radio channels that are controlled by the NSP and the MSC of the surrounding macro cellular system. The IS-41 protocol provides the specialized signaling between the two systems to coordinate the movement of the MS between the two radio channels.

During the MS telephone call, the MSC (or NSP) that is first to assign a traffic channel to a call on origination or termination is called the Anchor MSC (or NSP). For the duration of this call, this MSC shall be an anchor (i.e., fixed) point in the event that the MS should be handed off to other MSCs. The MSC controlling the call is termed the Serving MSC. A neighbor MSC is called a Candidate MSC if the neighbor is being considered as a possible server in a locate/handoff sequence. A neighbor MSC is called a Target MSC if the neighbor has been chosen by the Serving MSC as the next Serving MSC, but the handoff has not yet occurred.

Figure 8:
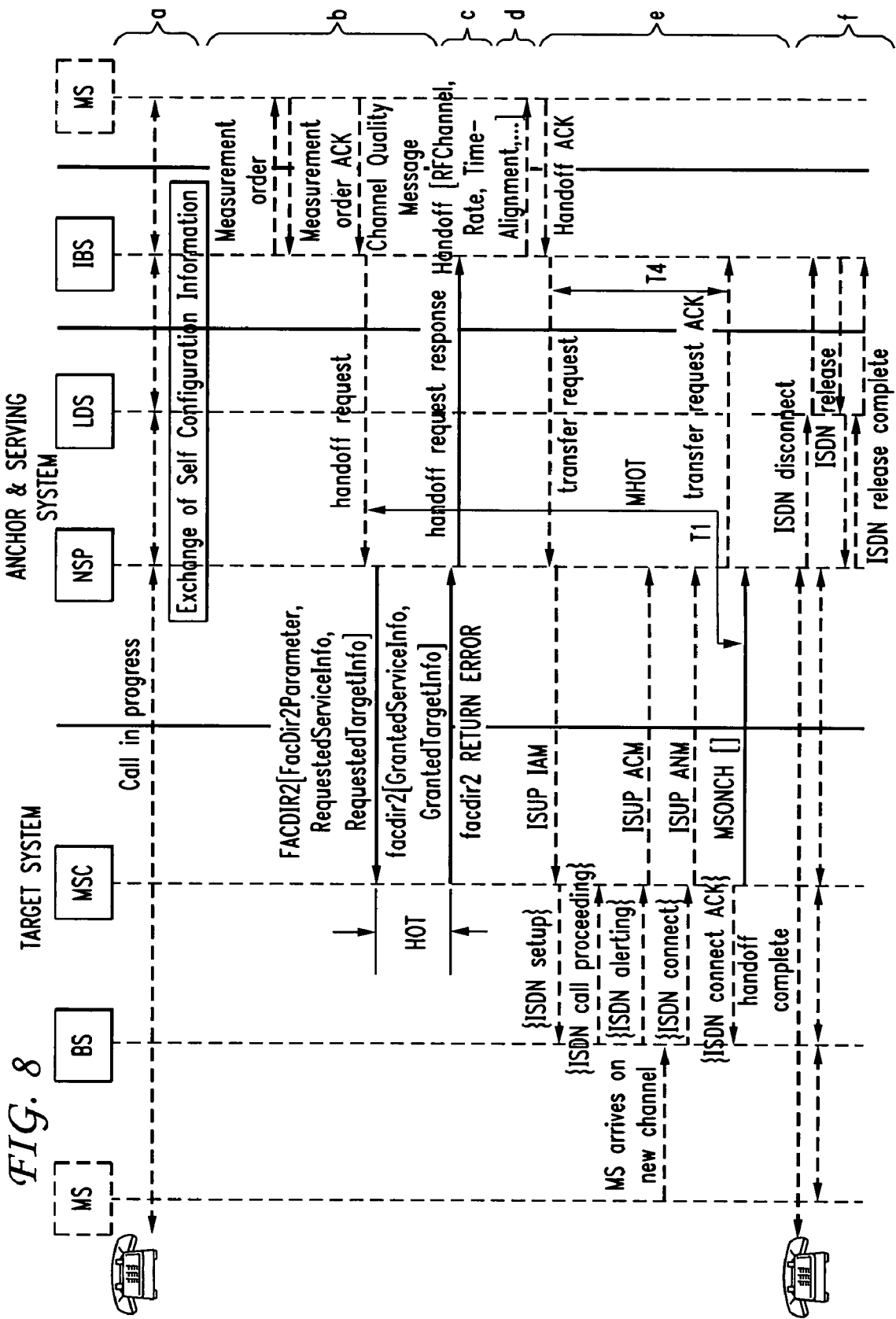
FIG. 8 illustrates an exemplary embodiment of the call flow for a hand-off from the LCS system to the macro-cellular system.

FIG. 8 illustrates an exemplary embodiment of the call flow for a hand-off from the LCS system to the macro-cellular system, when the target MSC is not already on the call path (forward hand-off). In step a, a call involving the served MS is in progress.

In step b, the NSP had received the information on the location and frequencies used by the MSC of the surrounding macro cellular system at the time of system initialization. The information has been distributed to the IBSs in the LCS system. The Self Configuration (SC) information between IBSs is being exchanged all the time during the LCS operation. The IBS sends a Measurement order (over the FACCH) to the MS to measure the BER and RSSI of the current channel and RSSIs of other RF channels. The MS acknowledges it by sending Measurement order ACK (over the FACCH). The MS performs channel quality measurements in response to the Measurement order from the IBS.

In step c, the IBS detects a handoff condition based on the received Channel Quality Messages and the threshold value. It finds that the candidate channel is on the MSC of the surrounding macro cellular system and it is not already on the call path (therefore, forward handoff). The IBS sends (intersystem) handoff request to the NSP.

In step d, upon receiving the handoff request from the IBS, the NSP sends an FACDIR2 to the Target MSC, directing the Target MSC to initiate a Handoff-Forward task. After checking that a voice channel on the designated target cell is available, the target MSC increases the Segment Counter in the received BillingID parameter by one and uses the new BillingID for the new call segment, returns a facdir2 to the NSP, and initiates a Handoff-Forward task. When the NSP receives the facdir2, it sends a handoff request response to the IBS.

In step e, the IBS sends the Handoff order to the served MS over the FACCH. The MS acknowledges the Handoff order to the IBS. Upon receiving the Handoff ACK, the IBS sends the transfer request to the NSP, which sets up the ISUP connections. When the MS is received on the designated voice channel, the Target MSC completes the voice path between the voice channel and the inter-MSC/NSP trunk. Upon receiving the ISUP ANM, the NSP sends a transfer request ACK to the IBS. Also, the Target MSC sends an MSONCH to the NSP to inform that the Target MSC has successfully completed the Handoff-Forward task. The NSP, on receipt of the MSONCH, completes the handoff process. The inter-MSC/NSP trunk should be connected at this time if it has not already been connected.

In step f, the NSP sends the ISDN disconnect message to the LDS and IBS, and the IBS sends the ISDN release message to the NSP which acknowledges it by sending the ISDN release complete message to the IBS.

Figure 9:
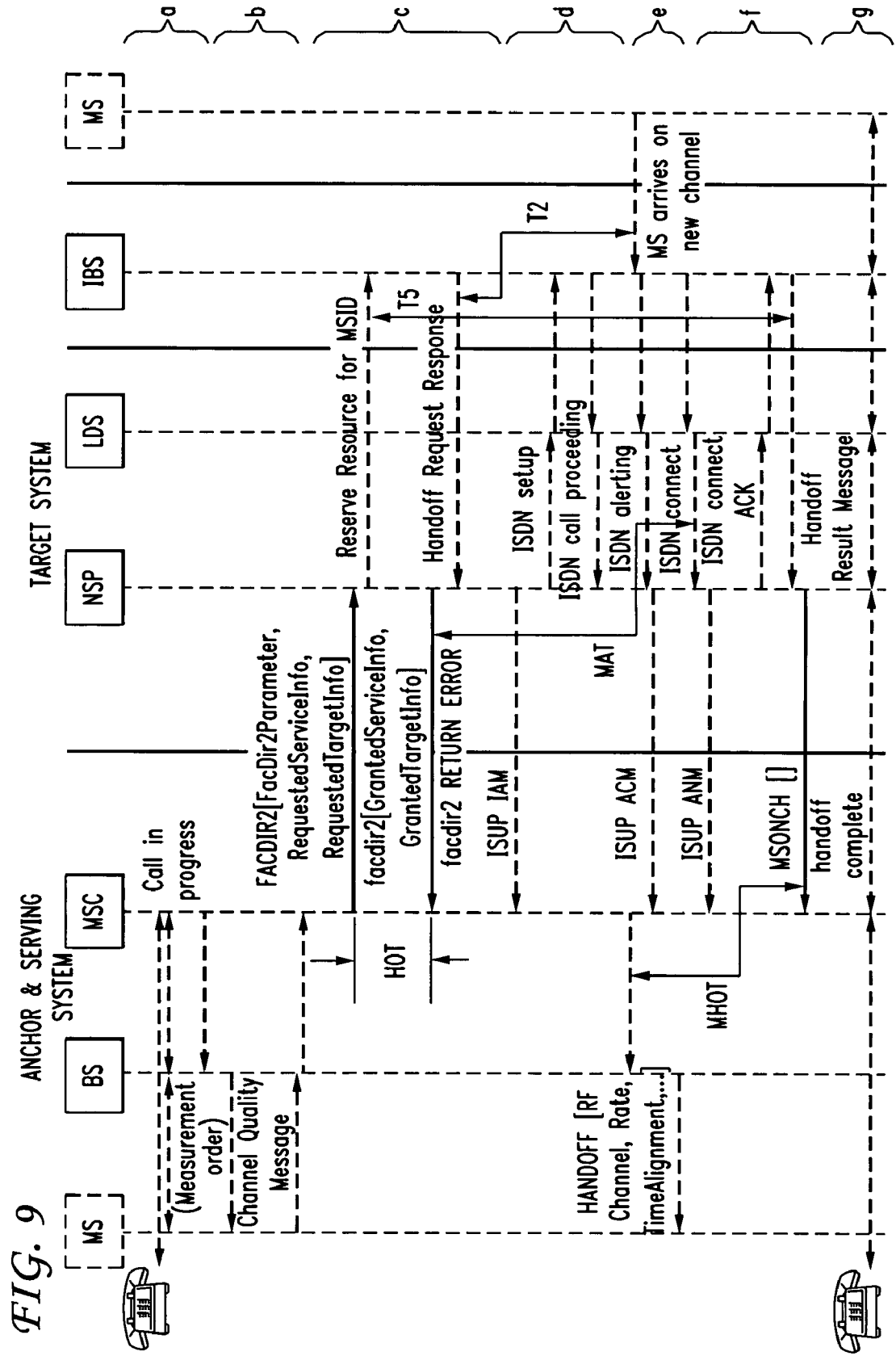
FIG. 9 illustrates an exemplary embodiment of the call flow for a hand-off from the macro-cellular system to the LCS system.

FIG. 9 illustrates an exemplary embodiment of the call flow for a hand-off from the macro-cellular system to the LCS system, when the target NSP is not already on the call path (forward hand-off). In step a, a call involving the served MS is in progress.

In step b, the MS performs channel quality measurements in response to the measurement order from the Serving MSC.

In step c, the Serving MSC determines that the call should be handed off to the LCS/NSP and that the target NSP is not already on the call path. In order for the surrounding MSCs to recognize that the call should be handed off to the LCS, the IBSs of the LCS system should use a fixed frequency set allocated for the LCS, rather than a dynamic frequency from the SC algorithm. The Serving MSC sends a FACDIR2 to the NSP, directing the NSP to initiate a Handoff-Forward task. The NSP sends Reserve Resource for MSID to the IBS, which acknowledges it by sending the Handoff Request Response. Now the NSP increases the Segment Counter in the received BillingID parameter by one and uses the new BillingID for the new call segment, returns a facdir2 to the requesting MSC, and initiates a Handoff-Forward task.

In step d, on the receipt of the facdir2, the Serving MSC initiates the inter-MSC/NSP connection by sending the ISUP IAM to the NSP. Upon receiving the ISUP IAM, the NSP sends the ISDN setup message to the SW (and to the IBS). The IBS responds the ISDN set up message by sending the ISDN call proceeding message to the NSP. When the NSP receives an ISDN alerting message from the IBS, it sends the ISUP ACM message to the MSC.

In step e, while setting up the inter-MSC/NSP connection, the MSC sends a Handoff order to the served MS. Upon receiving the Handoff order, the MS turns off the transmitter, adjusts power level, tunes to new RF channel, sets stored DVCCs to the DVCC information element of the handoff message, sets the transmit and receive rate to that indicated by the Rate information element, and sets the time slot to that indicated by the Timeslot Indicator information element. Once synchronized, it turns on the transmitter. The IBS then detects that the MS is on the new channel, via DVCC status change.

In step f, now the NSP completes the voice path between the voice channel and the inter-MSC/NSP trunk, by receiving the ISDN connect message from the IBS and sending the ISUP ANM to the MSC. When the NSP receives the Handoff Result Message from the IBS, it sends an MSONCH to the MSC, informing that the NSP has successfully completed the Handoff-Forward task.

In step g, the MSC, on receipt of the MSONCH, completes the handoff process. The inter-MSC/NSP trunk should be connected at this time if it has not already been connected.

The Intra-LCS Intra-Cell Mobile Assisted Handoff (MAHO)

There are two hand-offs possible in LCS service: an intra-cell mobile assisted hand-off (MAHO) and an inter-cell hand-off (for example, from an HNZ 105-1 to a VNZ 115-1 via a buffer zone). This section describes the end-to-end signaling flow scenario of Mobile Assisted HandOff (MAHO) between different RF channels within an IBS such as IBS 130-2 or cell such as home neighborhood zone (HNZ) 105-1.

In this invention, the preferred method is to use the radio frequency self-configuration algorithms as described by U.S. Pat. Nos. 5,809,423 (issued Sep. 15, 1998), 5,787,352 (issued Jul. 28, 1998), 5,740,536 (issued Apr. 14, 1998), 5,513,379 (issued Apr. 30, 1996), 5,404,574 (issued Apr. 4, 1995), and 5,345,499 (issued Sep. 6, 1994), all issued to B. Mathilde et al., all hereby incorporated by reference in their entireties, which may be implemented in the LCS network system to utilize the available RF channels that are not used by the primary macro-cellular system (represented by WS cell 101-2 in FIG. 1) for intra-cell hand-off. However, such a radio frequency self-configuration is an option and not mandatory for this invention.

When the LCS system does use a radio frequency self configuration algorithm, whenever the primary system starts to use the same RF channel, the radio in the LCS system and the active user may be required to move to another RF channel through the assistance of the RF self-configuration subsystem. As already described, each zone in a LCS system preferably has only one IBS 130. Once a RF channel is determined as noisy (e.g., from data received signal strength, RSSI, and/or the bit error rate), all the TDMA time slots within the channel may be considered to be noisy. In the intra-cell handoff scenario, therefore, all the active mobile stations using the noisy channel would re-tune to a new frequency.

Intra-cell handoff is attempted when the BER is high (bad) and the RSSI is good. (The threshold values for the BER and the RSSI may be provided by the RF Self-configuration subsystem). Upon receiving the request from the IBS 130 when handoff is needed, the RF Self-configuration subsystem may perform a calculation and return a new carrier frequency to the IBS 130 and the active MSs to re-tune to, or it may return a reject message when no carrier is available. If a new channel is available, the IBS 130 must re-tune to that new channel before the MS does.

When no new channel is available for the intra-cell handoff (i.e., the intra-cell handoff attempt has failed) but the RSSI from a neighboring IBS 130 is acceptable, the LCS system may attempt to handoff the active MSs to the neighboring IBS (V-IBS) 130 through intra-NSP handoff procedures (described in the next section).

If no channel is available for the handoff and the RSSI and BER measurement results of the current channel reach threshold values, the call may be dropped. The MS may be capable of performing the IS-136 channel measurement (RSSI and BER) procedures. Units of RF measurement used by the MS can be normalized by the IBS if they are not consistent with IBS RF measurement units. DTX Control is disabled (Discontinuous Transmission not supported). The IS-136 Channel Quality messages are sent over the SACCH.

The carrier channels may always be turned on even when the channel is not currently used by any MS. Therefore, it is possible for the MS to perform channel measurement on these channels. No reconfiguration of the ISDN connection as a result of the intra-cell handoff is necessary.

Figure 6A:
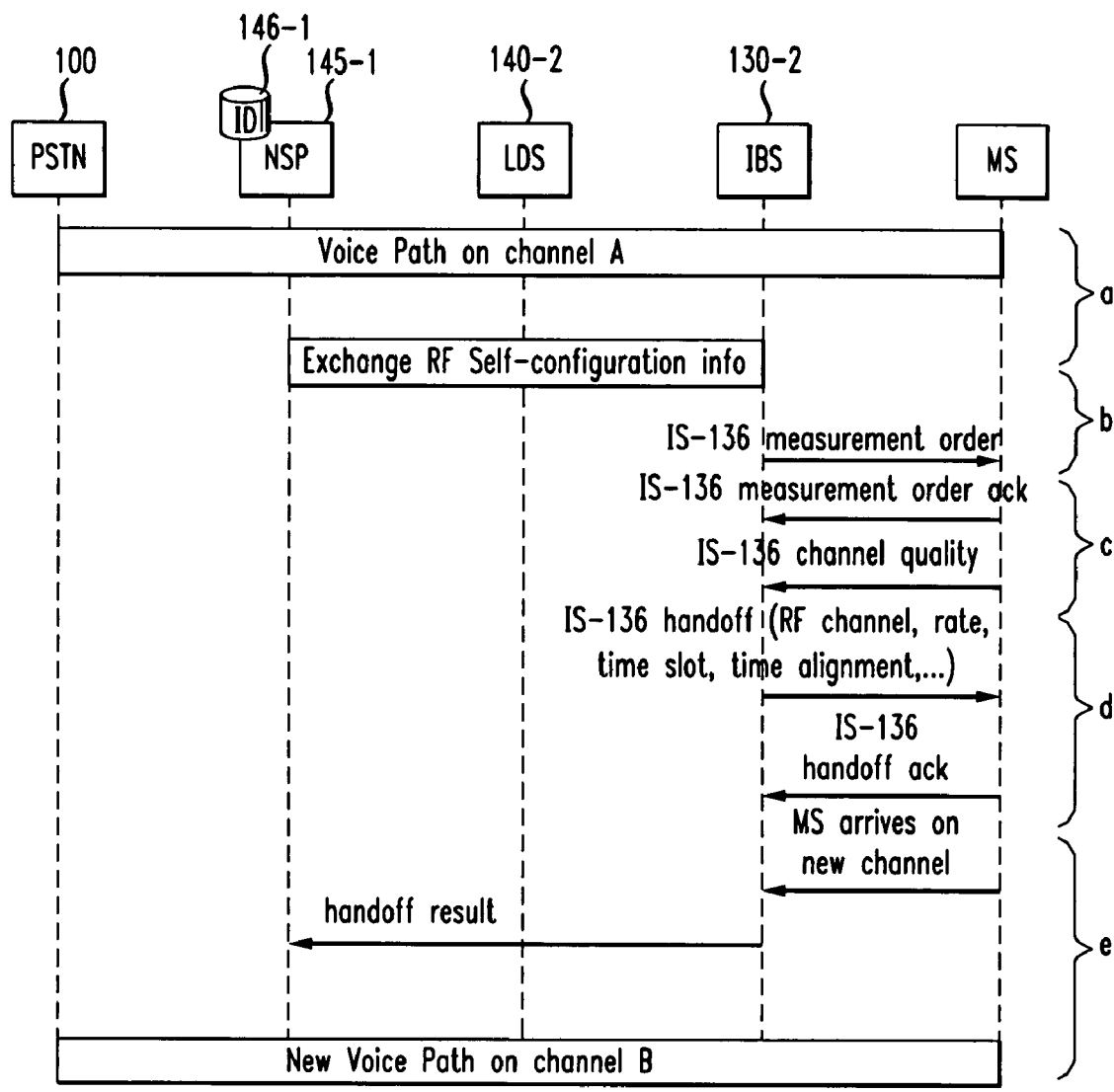
FIG. 6a shows an exemplary intra-cell call hand-off.

Referring to FIG. 6*a*, step "a", an active call between the MS and the PSTN user (or another MS user) involving an LDS (for example, LDS 140-2) and an IBS, such as IBS 130-2 is in progress using air interface channel A.

In step "b", the RF Self-configuration subsystem in the IBS 130-2 performs an RF Self-configuration algorithm and exchanges information with other IBSs (in the present example, IBS 130-1) in the subscribed-to zones.

In step "c", based on the information collected by the algorithm, the RF Self-configuration the subsystem determines which RF channels have to be measured by the MS. The IBS 130-2 sends the Measurement order (over the FACCH) to the registered MS. The MS acknowledges the instruction by sending the Measurement order ACK message back to the IBS 130-2 (over the FACCH). The MS follows the MAHO procedures defined in the IS-136.2 specification and sends channel quality message to the IBS (over the SACCH) in response to the Measurement order message.

In step "d", when the IBS 130-2 detects an intra-cell handoff condition based on the received channel quality message (i.e., BER and RSSI), the IBS 130-2 sends an intra-cell handoff request for a new channel to the RF Self-configuration subsystem. The subsystem performs a calculation and/or sends a new carrier frequency information to the IBS 130-2. Upon receiving the information, the IBS 130-2 sends a handoff command, in accordance with the IS-136.2 specification, to the MS (over the FACCH) requesting the MS to re-tune to a new RF channel (along with other channel assignment information). Handoff ACK is sent by the MS (over the FACCH). Responsive to receiving the acknowledgment from the MS, the IBS 130-2 re-tunes to the new RF (channel B).

In step "e", the MS turns off its transmitter, adjusts its power level, tunes to a new RF channel b, sets stored DVCC to the DVCC information element of the handoff message, sets the transmit and receive rate to that indicated by the Rate information element, and sets the time slot to that indicated by the Timeslot Indicator information element. Once synchronized, the MS turns on its transmitter. The IBS 130-2 then detects that the MS is on the new channel via DVCC status change. Upon detecting the MS on new channel, the IBS 130-2 sends Handoff Result messages to the NSP 145-1. The handoff is completed, and the call continues.

An Intra-NSP Inter-Cell MAHO (HNZ to Contiguous VNZ or VNZ to Contiguous VNZ))

When an active call is in progress, the MS measures the neighboring setup channels and the current active channel for RSSI and BER among other things. These IS-136 Channel Quality measurements help the system determine if the MAHO procedure is necessary to preserve the call. Furthermore, in order to perform a smooth, lossless handoff between the IBSs, LCS uses the Directed Call Pickup (DPU) with Barge-in feature of the LDS. DPU establishes a three-way call without disturbing the current call.

Figure 6B:
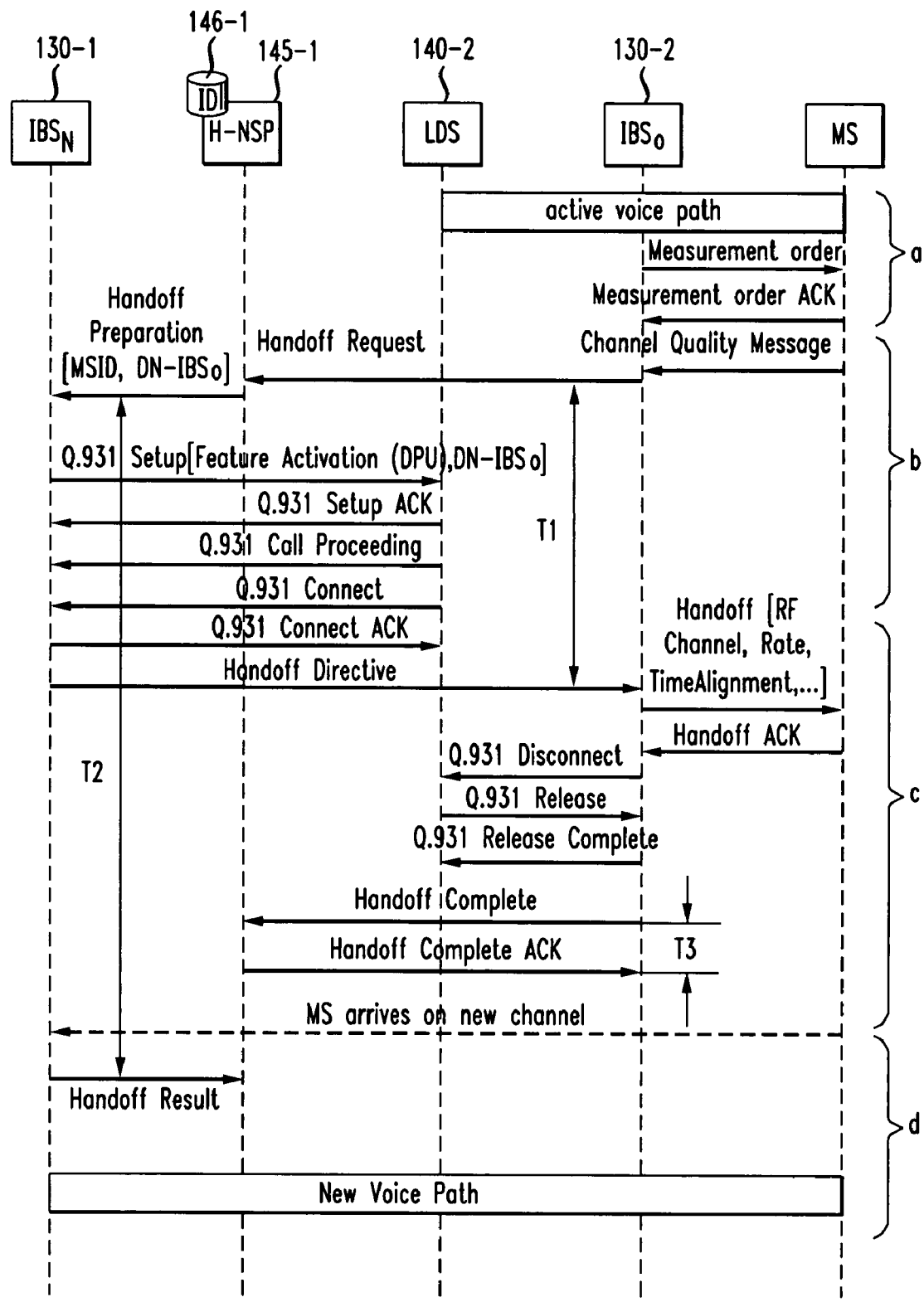
FIG. 6b shows an exemplary inter-cell call hand-off within, for example, NSP 145-1.

Referring to FIG. 6b, step "a", a mobile station is on an active call. H-IBS 130-2 directs the MS to start measuring the channel quality of the neighboring control channels and the current channel. The MS acknowledges the order and starts sending the IS-136 Channel Quality messages.

In step b, when H-IBS 130-2 detects a handoff condition based on the received channel quality messages (a low threshold value is reached), the H-IBS 130-2 sends a handoff request message. This message includes a priority list of the neighboring IBSs (V-IBS) such as V-IBS 130-1 along with the serving mobile MSID to the H-NSP 145-1. H-IBS 130-2 also starts the handoff request timer (T1). Once the H-NSP 145-1 receives the handoff request message, the H-NSP 145-1 will start at the top of the neighboring IBS (V-IBS) list and check the radio channel and B-channel availability of each entry. When an available neighboring IBS (V-IBS), such as V-IBS 130-1 is found, H-NSP 130-2 will request the V-IBS 130-1 to prepare for a handoff for the MS (MSID) and starts timer T2. In response, the V-IBS 130-1 will reserve the B-channel and the RF resources and start to initiate a three-way call using the directed call pickup with barge-in. IBS$_n$ sends a Q.931 Setup message that includes a feature activation code for DPU and the DN for the IBS to barge-in upon, IBS$_o$. IBS$_n$ 130-1 then waits for the LDS to indicate that the call has connected to IBS$_o$ 130-2. IBS$_n$ 130-1 then sends a Handoff Directive to IBS$_o$ 130-2 to inform the IBS that IBS$_n$ 130-1 has successfully established a three-way call (DPU).

In step c, after receiving the Handoff Directive, IBS$_o$ 130-2 cancels timer T1. IBS$_o$ sends an IS-136 Handoff order to the MS requesting it to retune to the new RF channel on IBS$_n$ 130-1. After the MS acknowledges the order, IBS$_o$130-2 starts to release the ISDN B-channel and simultaneously informs H-NSP 145-1 that it has completed the handoff to the new IBS, IBS$_n$ 130-1. H-NSP 145-1 acknowledges this notification.

In step d, when the MS arrives on the new channel, detected by IBS$_n$ 130-1 by the DVCC status change, IBS$_n$ 130-1 sends a Handoff Result message to H-NSP 145-1. H-NSP 145-1 notes that the handoff is completed to the new IBS and cancels timer T2. Voice path is established via a new route and the call continues.

Call Processing for an LCS Subscriber Who Makes an Outgoing Call

This section describes the signaling flow scenario for a call originated by the LCS subscriber from a subscribed-to neighborhood zone.

Figure 7:
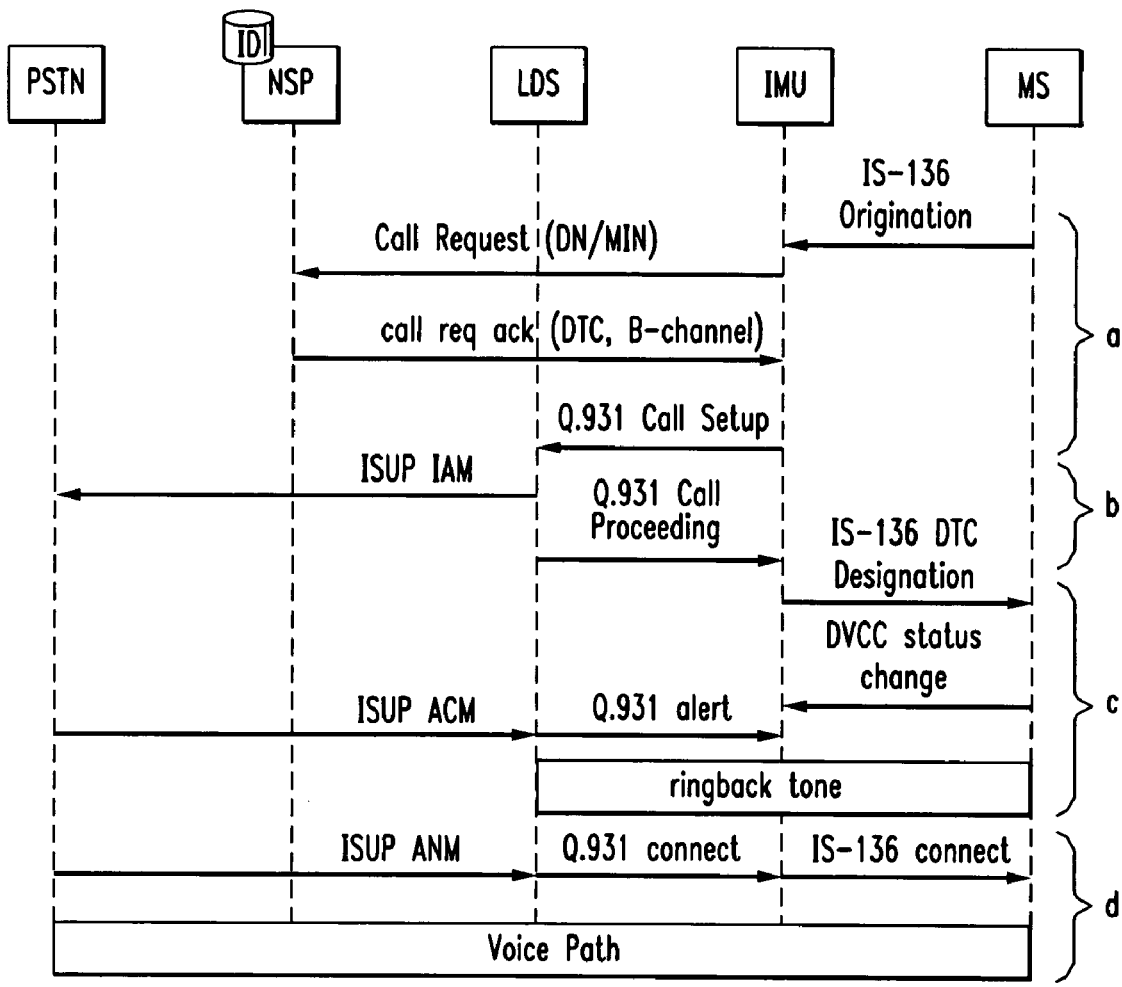
FIG. 7 shows an exemplary outgoing call from a LCS subscriber from a registered zone.

Referring to FIG. 7, step "a", the subscriber, for example, subscriber 10 in HNZ 105-1 dials a number on the MS; the MS sends an IS-136 origination message to the serving IBS 130-2. The IBS 130-2 sends a call request message to the NSP 145-1 to validate the call. The NSP 145-1 may initiate an authentication procedure via AC 190 when necessary. The NSP 145-1 validates the MS via its associated Intelligent Database (ID) 146-1. If the resources are available, it reserves a B-channel and DTC, and sends a call req ack message to the IBS 130-2 with the resource information. If no resources are available, NSP 145-1 send a call req nack and the IBS 130-2 rejects the call.

In step "b", the IBS 130-2 sends a Q.931 call setup message to the LCS local switch LDS 140-2. The LDS 140-2 sends an ISUP IAM message to the destination switch in the PSTN 100 to initiate end-to-end connection. The LDS 140-2 sends a Q.931 call proceeding message to the IBS 130-2 to connect the B-channel to the LDS 140-2.

In step "c", the IBS 130-2 sends an IS-136 DTC designation message to the MS and verifies the MS is on the DTC by monitoring the returning DVCC code status change. The LDS 140-2 receives an ISUP ACM message from the PSTN switch 100 and sends a Q.931 alert message to the IBS 130-2. The ring back tone is established between the LDS 140-2 and the MS.

Finally, in step "d", the LDS 140-2 receives an ISUP ANM message from the PSTN switch 100 when the destination user finally answers. The LDS 140-2 sends a Q.931 connect message to the IBS 130-2 to complete the end-to-end connection. The IBS 130-2 sends an IS-136 connect message to the MS and the voice path is established, thus completing the outgoing call process.

Call Release

Figure 10:
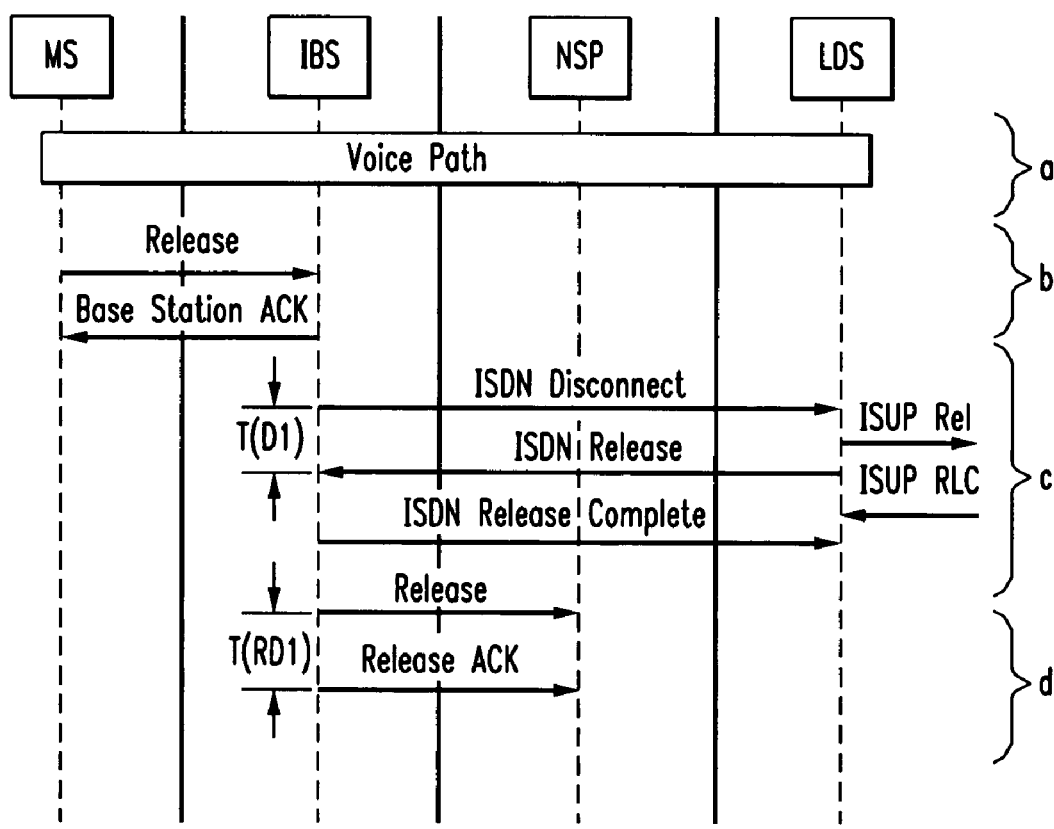
FIG. 10 illustrates an exemplary embodiment of a call release initiated by the MS.

FIG. 10 illustrates an exemplary embodiment of a call release initiated by the MS. In step a, the MS and called party are in a conversation state.

In step b, the MS user terminates the call. The MS sends Release message to IBS. IBS responds with a Base Station Ack message. After receiving the Base Station Ack from IBS, the MS turns off the transmitter, enters Serving System Determination Task.

In step c, the IBS sends ISDN Disconnect message to the LDS, and starts T(D1) timer to wait for ISDN Release message. LDS responds with an ISDN Release message to the IBS and also sends ISUP Rel to the remote side to release the voice connection. The remote side responds with ISUP Release Complete (RLC). After receiving ISDN Release message, IBS cancels T(D1) timer, sends ISDN Release Complete message to LDS.

In step d, the IBS sends Release message to NSP, and starts T(RD1) timer to wait for NSP's acknowledge. NSP sends Release Ack back to IBS, and deletes the call record. After receiving the Release Ack from NSP, IBS cancels T(RD1) timer, back to idle state.

Figure 11:
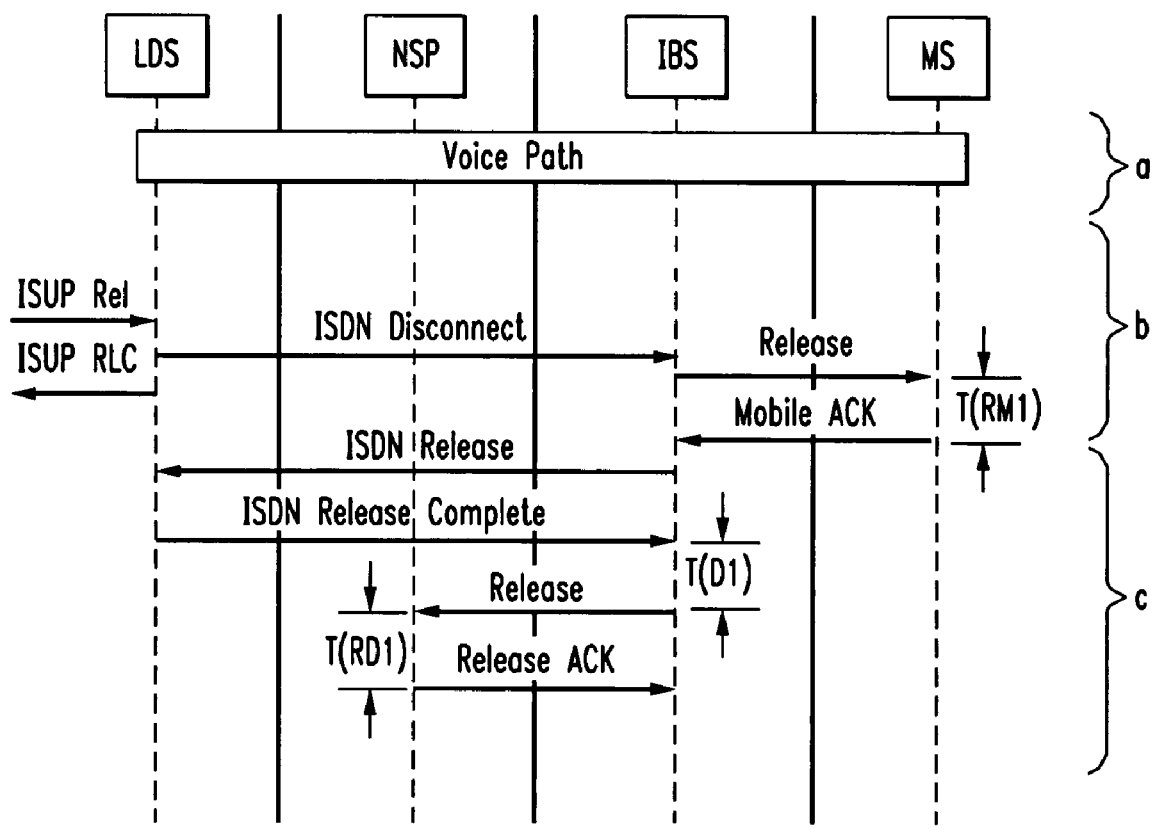
FIG. 11 illustrates an exemplary embodiment of a call release initiated by the remote side at the other end (initiated by the network).

FIG. 11 illustrates an exemplary embodiment of a call release initiated by the remote side at the other end (initiated by the network). In step a, the MS and the called party are in conversation state.

In step b, the LDS receives ISUP Rel from the remote end and responds with ISUP RLC (release complete). LDS sends ISDN Disconnect message to IBS. IBS in turn sends IS 136 Release message to MS and starts T(RM1) timer for MS's Mobile Ack message. MS then responds with a Mobile Ack message, turns off the transmitter, enters Serving System Determination Task.

In step c, after receiving the Mobile Ack message, IBS cancels T(RM1) timer, sends ISDN Release message to LDS, and starts T(D1) timer to wait for the ISDN Release Complete message from LDS. After receiving this message, IBS cancels T(D1) timer, sends Release message to NSP, and starts T(RD1) timer to wait for NSP's acknowledge. NSP sends Release Ack back to IBS, and deletes the call record. After receiving the Release Ack from NSP, IBS cancels T(RD1) timer, and returns to the idle state.

Thus, there has been described a complete system for providing a new local cordless services where a mobile subscriber may receive and make free calls within their subscribed-to neighborhood zones.

All United States patents referred to herein should be deemed to be incorporated by reference as to their entire contents. The following copending patent applications, which have each been filed on the same day as the present application, are hereby incorporated by reference as to their entire contents:

- U.S. patent application Ser. No. 09/223,322 filed Dec. 30, 1998, issued on Sep. 3, 2002 as U.S. Pat. No. 6,445,911 entitled "Method and Apparatus for Providing Neighborhood Cordless Services".
- U.S. patent application Ser. No. 09/223,320 filed Dec. 30, 1998, entitled "Automatic Status Indicators for Neighborhood Cordless Services," invented by A. Chow et al.
- U.S. patent application Ser. No. 09/223,318 filed Dec. 30, 1998, issued on Jul. 15, 2003 as U.S. Pat. No. 6,594,488 entitled "Method and Apparatus for Over-the-Air Activation of Neighborhood Cordless-Type Services".
- U.S. patent application Ser. No. 09/223,321 filed Dec. 30, 1998, issued on Oct. 22, 2002 as U.S. Pat. No. 6,470,179 entitled "Automatic Service Selection Feature for Neighborhood Residential Cordless Service".
- U.S. patent application Ser. No. 09/223,317 filed Dec. 30, 1998, issued on Jun. 5, 2001 as U.S. Pat. No. 6,243,572 entitled "Method and Apparatus for Billing a Neighborhood Cordless Service".

We claim:

1. A method comprising:
providing local cordless service to a mobile station operating within a subscribed-to home neighborhood zone;
billing said local cordless service within said subscribed-to home neighborhood zone at a fixed billing rate for unlimited airtime;
handing off service from said local cordless service to a public cellular service when said mobile station moves outside said subscribed-to home neighborhood zone, wherein said public cellular service is billed at a non-fixed billing rate based on airtime;
handing off service from said public cellular service to said local cordless service when said mobile station moves into a first subscribed-to visiting neighborhood zone wherein said fixed billing rate includes unlimited airtime within said first subscribed-to visiting neighborhood zone; and
handing off service to a second subscribed-to visiting neighborhood zone when said mobile station is not in said first subscribed-to visiting neighborhood zone and said mobile station is not in said subscribed-to home neighborhood zone, wherein said second subscribed-to visiting neighborhood zone is billed at rate different than said fixed billing rate.

2. The method of claim 1 further comprising:
handing off service from said public cellular service to said local cordless service when said mobile station returns to said subscribed-to home neighborhood zone.

3. A method comprising:
providing local cordless service to a mobile station operating within a subscribed-to home neighborhood zone;
providing local cordless service to said mobile station when said mobile station moves outside said subscribed-to home neighborhood zone to a first subscribed-to visiting neighborhood zone;
providing local cordless service to said mobile station when said mobile station moves outside said subscribed-to home neighborhood zone and said first subscribed-to visiting neighborhood zone to a second subscribed to visiting neighborhood zone;
billing said local cordless service at a fixed billing rate for unlimited airtime within said subscribed-to home neighborhood zone and said first subscribed-to visiting neighborhood zone; and
billing local cordless service provided to a mobile station in a second subscribed-to visiting neighborhood zone at a rate different than the fixed billing rate.

4. The method of claim 3 further comprising:
handing off service from said local cordless service to a public cellular service when said mobile station moves outside said first subscribed-to visiting neighborhood zone, and said second subscribed-to visiting neighborhood zone.

5. The method of claim 4 wherein said public cellular service is billed at a non-fixed billing rate based on airtime.

6. The method of claim 4 wherein said fixed billing rate includes unlimited airtime for said public cellular service.

7. The method of claim 3 further comprising:
terminating service to said mobile station if said mobile station moves outside said subscribed-to home neighborhood zone, said first subscribed-to visiting neighborhood zone, and said second subscribed-to visiting neighborhood zone.

* * * * *